(12) United States Patent
Kishimoto et al.

(10) Patent No.: US 11,764,366 B2
(45) Date of Patent: *Sep. 19, 2023

(54) CATHODE, MEMBRANE ELECTRODE ASSEMBLY, AND BATTERY

(71) Applicant: NISSHINBO HOLDINGS INC., Tokyo (JP)

(72) Inventors: Takeaki Kishimoto, Funabashi (JP); Yoshikazu Kobayashi, Chiba (JP); Chihiro Fujii, Chiba (JP); Siyu Ye, Burnaby (CA); Dustin William H Banham, West Vancouver (CA)

(73) Assignee: NISSHINBO HOLDINGS INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/829,878

(22) Filed: Jun. 1, 2022

(65) Prior Publication Data

US 2022/0293968 A1  Sep. 15, 2022

Related U.S. Application Data

(63) Continuation of application No. 16/761,351, filed as application No. PCT/JP2017/041282 on Nov. 16, 2017, now Pat. No. 11,387,465.

(51) Int. Cl.
*H01M 4/92* (2006.01)
*H01M 4/86* (2006.01)
(Continued)

(52) U.S. Cl.
CPC ......... *H01M 4/926* (2013.01); *H01M 4/8657* (2013.01); *H01M 4/96* (2013.01); *H01M 8/1004* (2013.01)

(58) Field of Classification Search
CPC ...... H01M 4/926; H01M 4/8657; H01M 4/96; H01M 8/1004; H01M 4/925;
(Continued)

(56) References Cited

U.S. PATENT DOCUMENTS

| 8,148,026 B2 | 4/2012 | Oh et al. |
| 2005/0142433 A1 | 6/2005 | Ueda et al. |

(Continued)

FOREIGN PATENT DOCUMENTS

| CN | 103072973 A | 5/2013 |
| CN | 104321276 A | 1/2015 |

(Continued)

OTHER PUBLICATIONS

Feb. 6, 2018 International Search Report issued in International Patent Application No. PCT/JP2017/041282.

(Continued)

*Primary Examiner* — Helen Oi K Conley
(74) *Attorney, Agent, or Firm* — Oliff PLC

(57) ABSTRACT

A cathode of a battery including an electrolyte membrane, containing a first layer which contains 0.3 mg/cm$^2$ or more and 9.0 mg/cm$^2$ or less of a carbon catalyst; and a second layer which is arranged between the electrolyte membrane and the first layer in the battery, and which contains 0.002 mg/cm$^2$ or more and 0.190 mg/cm$^2$ or less of platinum. The carbon catalyst has a ratio of a mesopore volume to a total pore volume of 30% or more.

20 Claims, 6 Drawing Sheets

(51) Int. Cl.
*H01M 4/96* (2006.01)
*H01M 8/1004* (2016.01)

(58) Field of Classification Search
CPC .... H01M 2250/20; H01M 4/92; H01M 4/923; H01M 8/1018; H01M 8/122; H01M 4/8642; H01M 4/8663; H01M 2004/8689; H01M 2008/1095; Y02T 90/40
See application file for complete search history.

(56) References Cited

U.S. PATENT DOCUMENTS

| | | |
|---|---|---|
| 2009/0074956 A1 | 3/2009 | Taylor |
| 2013/0217567 A1 | 8/2013 | Kishimoto et al. |
| 2015/0303487 A1 | 10/2015 | Kamai et al. |
| 2018/0097240 A1 | 4/2018 | Feaver et al. |
| 2019/0143308 A1 | 5/2019 | Kishimoto et al. |

FOREIGN PATENT DOCUMENTS

| | | |
|---|---|---|
| EP | 1045467 A1 | 10/2000 |
| JP | 2012-101155 A | 5/2012 |
| JP | 2016-015283 A | 1/2016 |
| JP | 2016-032802 A | 3/2016 |
| JP | 2016-207575 A | 12/2016 |
| KR | 10-2009-0009643 A | 1/2009 |
| WO | 2017/199653 A1 | 11/2017 |

OTHER PUBLICATIONS

May 17, 2021 extended Search Report issued in European Patent Application No. 17932391.0.

Liang et al., Mesoporous Metal-Nitrogen-Doped Carbon Electrocatalysts for Highly Efficient Oxygen Reduction Reaction, J. Am. Chem. Soc. 2013, 135, 43, 16002-16005 (Year: 2013).

Nov. 22, 2021 Office Action issued in Chinese Patent Application No. 201780096882.8.

FIG.4A

| PREPARATION EXAMPLE | TG WEIGHT REDUCTION RATE (wt%) | XAFS | | | | | OXYGEN REDUCTION ACTIVITY |
|---|---|---|---|---|---|---|---|
| | | NORMALIZED ABSORBANCE | | | RATIO 7130/7110 | RATIO 7135/7110 | $i_{0.7}$ (mA/cm²) |
| | | 7110 eV | 7130 eV | 7135 eV | | | |
| EX.1 | 6.8 | 0.08 | 1.24 | 1.23 | 15.5 | 15.4 | −1.2 |
| EX.2 | 6.9 | 0.09 | 1.24 | 1.24 | 13.8 | 13.8 | −1.4 |
| EX.3 | 6.5 | 0.08 | 1.26 | 1.25 | 15.8 | 15.6 | −1.4 |
| EX.4 | 6.7 | 0.08 | 1.24 | 1.24 | 15.5 | 15.5 | −1.4 |
| EX.5 | 6.7 | 0.08 | 1.25 | 1.23 | 15.6 | 15.4 | −1.4 |
| EX.6 | 7.3 | 0.08 | 1.26 | 1.24 | 15.8 | 15.5 | −1.2 |
| COMPARATIVE EX.1 | 6.9 | 0.17 | 1.08 | 1.02 | 6.4 | 6.0 | −0.6 |
| COMPARATIVE EX.2 | 12.5 | 0.08 | 1.22 | 1.21 | 15.3 | 15.1 | −2.0 |
| COMPARATIVE EX.3 | 30.6 | 0.06 | 1.26 | 1.24 | 21.0 | 20.7 | −0.9 |
| COMPARATIVE EX.4 | 23.2 | 0.09 | 1.3 | 1.24 | 14.4 | 13.8 | −0.1 |

FIG.4B

| PREPARATION EXAMPLE | BET SPECIFIC SURFACE AREA ($m^2/g$) | MICROPORE VOLUME ($cm^3/g$) | MESOPORE VOLUME ($cm^3/g$) | MACROPORE VOLUME ($cm^3/g$) | MESOPORE RATIO (%) | CONTENT OF Fe MEASURED BY ICP-MS (wt%) | XPS | | | | ELEMENTAL ANALYSIS (COMBUSTION METHOD) | | | |
|---|---|---|---|---|---|---|---|---|---|---|---|---|---|---|
| | | | | | | | C (atm%) | O (atm%) | N (atm%) | N/C (%) | C (wt%) | H (wt%) | N (wt%) | N/C (%) |
| EX.1 | 1520 | 0.40 | 0.30 | 0.02 | 42 | 0.22 | 84.8 | 13.7 | 1.4 | 1.7 | 91.1 | 1.0 | 1.7 | 1.8 |
| EX.2 | 1510 | 0.45 | 0.26 | 0.02 | 36 | 0.30 | 89.4 | 8.7 | 1.7 | 1.9 | 98.6 | 0.4 | 1.8 | 1.9 |
| EX.3 | 1440 | 0.44 | 0.35 | 0.01 | 44 | 0.22 | 90.7 | 7.2 | 1.9 | 2.1 | 89.5 | 0.7 | 1.9 | 2.1 |
| EX.4 | 1540 | 0.42 | 0.34 | 0.02 | 44 | 0.21 | 89.3 | 8.6 | 1.9 | 2.1 | 90.9 | 0.7 | 2.0 | 2.2 |
| EX.5 | 1650 | 0.52 | 0.48 | 0.02 | 47 | 0.24 | 88.7 | 9.5 | 1.6 | 1.8 | 87.3 | 0.7 | 1.6 | 1.8 |
| EX.6 | 1610 | 0.47 | 0.50 | 0.01 | 51 | 0.25 | 88.6 | 9.8 | 1.4 | 1.6 | 92.8 | 1.7 | 1.5 | 1.6 |
| COMPARATIVE EX.1 | 1420 | 0.44 | 0.28 | 0.02 | 38 | 0.43 | 93.4 | 4.9 | 1.5 | 1.6 | 90.4 | 1.0 | 1.6 | 1.7 |
| COMPARATIVE EX.2 | 1400 | 0.38 | 0.28 | 0.03 | 41 | 0.54 | 91.4 | 5.8 | 2.7 | 2.9 | 83.7 | 1.3 | 4.8 | 5.8 |
| COMPARATIVE EX.3 | 1180 | 0.44 | 0.09 | 0.01 | 17 | 0.28 | 86.7 | 3.0 | 10.2 | 11.7 | 72.6 | 1.5 | 15.8 | 21.7 |
| COMPARATIVE EX.4 | 1050 | 0.25 | 0.07 | 0.02 | 21 | 0.24 | 90.6 | 5.9 | 2.9 | 3.1 | 90.8 | 0.5 | 2.9 | 3.2 |

FIG.5

| SAMPLE | CARBON CATALYST(CC) | | | Pt/SUPPORT | | | Pt/CC (wt%) | POWER GENERATION TEST AND DURABILITY TEST | | |
|---|---|---|---|---|---|---|---|---|---|---|
| | SAMPLE | CATALYST CONTENT (mg/cm$^2$) | ELECTROLYTE MATERIAL RATIO | Pt/(Pt/SUPPORT) (wt%) | Pt CONTENT (mg-Pt/cm$^2$) | ELECTROLYTE MATERIAL RATIO | | BOL (mV) | EOL (mV) | BOL-EOL (mV) |
| EXAMPLE 1 | EX.1 | 2.5 | 0.70 | 40 | 0.050 | 0.70 | 2.00 | 756.4 | 715.2 | 41.2 |
| EXAMPLE 2 | EX.1 | 2.5 | 0.70 | 40 | 0.020 | 0.70 | 0.80 | 720.8 | 693.4 | 27.4 |
| EXAMPLE 3 | EX.1 | 2.5 | 0.70 | 40 | 0.005 | 0.70 | 0.20 | 718.3 | 685.6 | 32.7 |
| EXAMPLE 4 | EX.1 | 2.5 | 0.70 | 40 | 0.100 | 0.70 | 4.00 | 760.6 | 717.3 | 43.3 |
| EXAMPLE 5 | EX.1 | 1.0 | 0.70 | 40 | 0.050 | 0.70 | 5.00 | 736.2 | 697.8 | 38.4 |
| EXAMPLE 6 | EX.1 | 1.0 | 0.70 | 40 | 0.020 | 0.70 | 2.00 | 713.8 | 685.5 | 28.3 |
| EXAMPLE 7 | EX.1 | 1.0 | 0.70 | 40 | 0.005 | 0.70 | 0.50 | 700.2 | 667.8 | 32.4 |
| EXAMPLE 8 | EX.1 | 6.0 | 0.70 | 40 | 0.050 | 0.70 | 0.83 | 755.8 | 715.0 | 40.8 |
| EXAMPLE 9 | EX.1 | 2.5 | 0.90 | 40 | 0.050 | 0.70 | 2.00 | 755.6 | 713.7 | 41.9 |
| EXAMPLE 10 | EX.1 | 2.5 | 0.90 | 40 | 0.020 | 0.70 | 0.80 | 720.0 | 692.3 | 27.7 |
| EXAMPLE 11 | EX.1 | 2.5 | 0.70 | 40 | 0.050 | 0.50 | 2.00 | 755.5 | 715.9 | 39.6 |
| EXAMPLE 12 | EX.1 | 2.5 | 0.70 | 40 | 0.020 | 0.50 | 0.80 | 720.9 | 692.3 | 28.6 |
| EXAMPLE 13 | EX.1 | 2.5 | 0.70 | 40 | 0.050 | 0.20 | 2.00 | 755.0 | 716.4 | 38.6 |
| EXAMPLE 14 | EX.1 | 2.5 | 0.70 | 40 | 0.020 | 0.20 | 0.80 | 719.4 | 690.4 | 29.0 |
| EXAMPLE 15 | EX.2 | 2.5 | 0.70 | 40 | 0.050 | 0.70 | 2.00 | 757.5 | 715.8 | 41.7 |
| EXAMPLE 16 | EX.3 | 2.5 | 0.70 | 40 | 0.050 | 0.70 | 2.00 | 755.4 | 715.3 | 40.1 |
| EXAMPLE 17 | EX.4 | 2.5 | 0.70 | 40 | 0.050 | 0.70 | 2.00 | 755.8 | 714.2 | 41.6 |
| EXAMPLE 18 | EX.5 | 2.5 | 0.70 | 40 | 0.050 | 0.70 | 2.00 | 755.3 | 713.8 | 41.5 |
| EXAMPLE 19 | EX.6 | 2.5 | 0.70 | 40 | 0.050 | 0.70 | 2.00 | 755.0 | 713.2 | 41.8 |
| EXAMPLE 20 | EX.1 | 2.5 | 0.70 | 20 | 0.050 | 0.70 | 2.00 | 755.8 | 714.3 | 41.5 |
| EXAMPLE 21 | EX.1 | 2.5 | 0.70 | 40 | 0.050 | 1.20 | 2.00 | 738.2 | 685.4 | 52.8 |
| EXAMPLE 22 | EX.1 | 2.5 | 0.70 | 40 | 0.050 | 0.10 | 2.00 | 715.4 | 662.1 | 53.3 |
| EXAMPLE 23 | EX.1 | 2.5 | 0.50 | 40 | 0.050 | 0.70 | 2.00 | 718.3 | 660.3 | 58.0 |
| COMPARATIVE EXAMPLE 1 | EX.1 | 2.5 | 0.70 | 40 | 0.200 | 0.70 | 8.00 | 799.0 | 716.4 | 82.6 |
| COMPARATIVE EXAMPLE 2 | EX.1 | 2.5 | 0.70 | 40 | 0.001 | 0.70 | 0.04 | 722.8 | 641.5 | 81.3 |
| COMPARATIVE EXAMPLE 3 | EX.1 | 1.0 | 0.70 | 40 | 0.001 | 0.70 | 0.10 | 687.2 | 596.5 | 90.7 |
| COMPARATIVE EXAMPLE 4 | EX.1 | 2.5 | 0.70 | 0 | 0.000 | – | 0.00 | 713.8 | 635.2 | 78.6 |
| COMPARATIVE EXAMPLE 5 | EX.1 | 1.0 | 0.70 | 0 | 0.000 | – | 0.00 | 685.7 | 575.4 | 110.3 |
| COMPARATIVE EXAMPLE 6 | – | 0.0 | – | 40 | 0.100 | 0.70 | – | 776.0 | 524.5 | 251.5 |
| COMPARATIVE EXAMPLE 7 | – | 0.0 | – | 40 | 0.050 | 0.70 | – | 732.1 | 545.7 | 186.4 |
| COMPARATIVE EXAMPLE 8 | – | 0.0 | – | 40 | 0.020 | 0.70 | – | 617.0 | 446.8 | 170.2 |
| COMPARATIVE EXAMPLE 9 | EX.1 | 10.0 | 0.70 | 40 | 0.050 | 0.70 | 0.50 | 718.8 | 650.5 | 68.3 |
| COMPARATIVE EXAMPLE 10 | EX.1 | 10.0 | 0.70 | 40 | 0.020 | 0.70 | 0.20 | 668.4 | 601.5 | 66.9 |
| COMPARATIVE EXAMPLE 11 | EX.1 | 0.2 | 0.70 | 40 | 0.050 | 0.70 | 25.00 | 732.8 | 577.8 | 155.0 |
| COMPARATIVE EXAMPLE 12 | EX.1 | 0.2 | 0.70 | 40 | 0.020 | 0.70 | 10.00 | 647.5 | 498.6 | 148.9 |
| COMPARATIVE EXAMPLE 13 | COMPARATIVE EX.1 | 2.5 | 0.70 | 40 | 0.050 | 0.70 | 2.00 | 740.6 | 660.8 | 79.8 |
| COMPARATIVE EXAMPLE 14 | COMPARATIVE EX.2 | 2.5 | 0.70 | 40 | 0.050 | 0.70 | 2.00 | 758.3 | 650.2 | 108.1 |
| COMPARATIVE EXAMPLE 15 | COMPARATIVE EX.3 | 2.5 | 0.70 | 40 | 0.050 | 0.70 | 2.00 | 728.5 | 600.3 | 128.2 |
| COMPARATIVE EXAMPLE 16 | COMPARATIVE EX.4 | 2.5 | 0.70 | 40 | 0.050 | 0.70 | 2.00 | 734.5 | 550.6 | 183.9 |

CATHODE, MEMBRANE ELECTRODE ASSEMBLY, AND BATTERY

CROSS REFERENCE TO RELATED APPLICATIONS

This is a Continuation of application Ser. No. 16/761,351, filed May 4, 2020, which is a 35 U.S.C. § 371 national stage patent application of international patent application PCT/JP2017/041282, filed on Nov. 16, 2017. The disclosures of the prior applications are hereby incorporated by reference herein in their entireties.

TECHNICAL FIELD

The present invention relates to a cathode, a membrane electrode assembly, and a battery.

BACKGROUND ART

Currently, as a catalyst for an electrode of a fuel cell, a platinum catalyst is used. However, there are many problems to be solved. For example, the reserves of platinum are limited. In a polymer electrolyte fuel cell (PEFC), the use of platinum increases cost. In particular, in a cathode of the PEFC, there is a problem in that a large amount of the platinum catalyst is required in order to obtain sufficient power generation performance and durability. In addition, there is a problem in that the platinum catalyst is liable to be poisoned when a gas, such as carbon monoxide, sulfur dioxide, nitrogen monoxide, or nitrogen dioxide, is adsorbed on the platinum catalyst. Therefore, an alternative technology without using the platinum catalyst, or using a lower amount of the platinum catalyst, has been developed.

For example, in Patent Literature 1, there is described a cathode electrode structure for a fuel cell. The cathode electrode structure for a fuel cell is an electrode structure in which a layer A containing a catalyst and an ionomer and a layer B containing a catalyst and an ionomer are laminated on each other. The catalyst contained in the layer A contains 70 wt % or more of a carbon catalyst, and the catalyst contained in the layer B contains 70 wt % or more of a platinum-supported carbon catalyst.

In Patent Literature 2, there is described a fuel cell including: an electrolyte layer; a fuel-side electrode which is arranged on one side of the electrolyte layer in a thickness direction, and is supplied with a fuel; an oxygen-side electrode which is arranged on another side of the electrolyte layer in the thickness direction, and is supplied with oxygen; and a fuel decomposition layer which is arranged between the electrolyte layer and the oxygen-side electrode, and is configured to decompose the fuel having passed through the electrolyte layer.

CITATION LIST

Patent Literature

[PTL 1] JP 2016-015283 A
[PTL 2] JP 2016-207575 A

SUMMARY OF INVENTION

Technical Problem

However, the durability of the cathode of the fuel cell has not hitherto been sufficient.

The present invention has been made in view of the above-mentioned problems, and one of the objects of the present invention is to provide a cathode, a membrane electrode assembly, and a battery, each having excellent durability.

Solution to Problem

In order to solve the above-mentioned problems, a cathode according to one embodiment of the present invention is a cathode of a battery including an electrolyte membrane, the cathode including: a first layer which contains 0.3 mg/cm$^2$ or more and 9.0 mg/cm$^2$ or less of a carbon catalyst; and a second layer which is arranged between the electrolyte membrane and the first layer in the battery, and which contains 0.002 mg/cm$^2$ or more and 0.190 mg/cm$^2$ or less of platinum. According to the one embodiment of the present invention, the cathode having excellent durability is provided.

The carbon catalyst may contain iron, exhibit a weight reduction rate at 200° C. to 1,200° C. of 12.0 wt % or less measured by thermogravimetric analysis in a nitrogen atmosphere, and may have a carbon structure that exhibits, in X-ray absorption fine structure analysis of a K absorption edge of the iron, the following (a) and/or (b): (a) a ratio of a normalized absorbance at 7,130 eV to a normalized absorbance at 7,110 eV is 7.0 or more; and (b) a ratio of a normalized absorbance at 7,135 eV to a normalized absorbance at 7,110 eV is 7.0 or more.

The carbon catalyst may have a ratio of a mesopore volume to a total pore volume of 20% or more. The carbon catalyst may have a content of iron of 0.01 wt % or more measured by inductively-coupled plasma mass spectrometry. The carbon catalyst may exhibit a nitrogen atom content of 1.0 wt % or more measured by elemental analysis based on a combustion method. The carbon catalyst may exhibit a ratio of a nitrogen atom content to a carbon atom content of 1.1% or more measured by elemental analysis based on a combustion method. The carbon catalyst may contain iron and a metal other than the iron. The carbon catalyst may have a specific surface area of 800 m$^2$/g or more measured by a BET method.

The first layer may contain an electrolyte material, and have a ratio of a weight of the electrolyte material to a remaining weight obtained by subtracting the weight of the electrolyte material from a weight of the first layer of 0.30 or more. The second layer may contain an electrolyte material, and have a ratio of a weight of the electrolyte material to a remaining weight obtained by subtracting the weight of the electrolyte material from a weight of the second layer of 0.05 or more. The cathode may have a ratio of a content of the platinum in the second layer to a content of the carbon catalyst in the first layer of 20.00 wt % or less. The first layer and/or the second layer may contain an electrolyte material having an EW value of 300 or more and 1,100 or less.

In order to solve the above-mentioned problems, a membrane electrode assembly according to one embodiment of the present invention includes anyone of the above-mentioned cathode, an anode, and an electrolyte membrane arranged between the cathode and the anode. According to the one embodiment of the present invention, the membrane electrode assembly having excellent durability is provided.

In order to solve the above-mentioned problems, a battery according to one embodiment of the present invention includes any one of the above-mentioned cathode or the above-mentioned membrane electrode assembly. According to the one embodiment of the present invention, the battery having excellent durability is provided. The battery may be a fuel cell.

Advantageous Effects of Invention

According to the present invention, a cathode, a membrane electrode assembly, and a battery, each having excellent durability, are provided.

BRIEF DESCRIPTION OF DRAWINGS

FIG. 4A is an explanatory diagram showing an example of results obtained by evaluating carbon catalysts in Examples according to one embodiment of the present invention.

FIG. 4B is an explanatory diagram showing another example of results obtained by evaluating the carbon catalysts in Examples according to the one embodiment of the present invention.

FIG. 5 is an explanatory diagram showing an example of results obtained by evaluating durability in Examples according to one embodiment of the present invention.

DESCRIPTION OF EMBODIMENTS

A cathode, a membrane electrode assembly, and a battery according to one embodiment of the present invention will be described below. The present invention is not limited to examples described in this embodiment.

The cathode according to this embodiment is a cathode of a battery including an electrolyte membrane, and includes: a first layer which contains 0.3 mg/cm$^2$ or more and 9.0 mg/cm$^2$ or less of a carbon catalyst; and a second layer which is arranged between the electrolyte membrane and the first layer in the battery, and which contains 0.002 mg/cm$^2$ or more and 0.190 mg/cm$^2$ or less of platinum.

The membrane electrode assembly (hereinafter referred to as "MEA") according to this embodiment includes the cathode according to this embodiment, an anode, and an electrolyte membrane arranged between the cathode and the anode. The battery according to this embodiment includes the cathode according to this embodiment or the MEA according to this embodiment.

The inventors of the present invention have undertaken extensive investigations on technical means for achieving a cathode, MEA, and a battery, each having excellent durability, and as a result, have uniquely found that the excellent durability is achieved when the cathode includes: a first layer which contains a carbon catalyst in an amount within a particular range; and a second layer which is arranged between the first layer and an electrolyte membrane of the MEA or the battery, and which contains platinum in an amount within a particular range.

Figure 1:
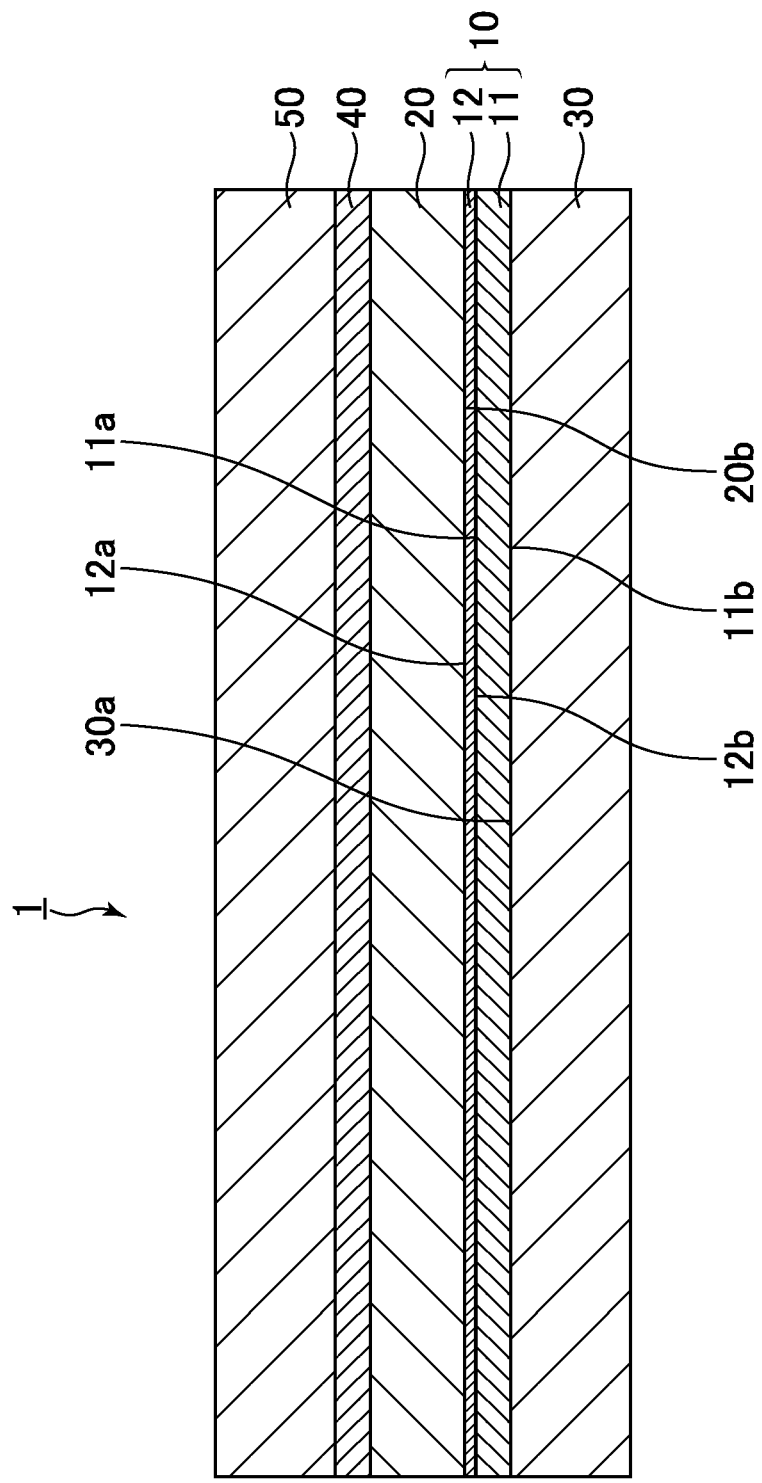
FIG. 1 is an explanatory diagram for illustrating a cross section of a membrane electrode assembly according to an example of one embodiment of the present invention.

In FIG. 1, there is illustrated a cross section of a MEA 1 according to an example of this embodiment. In the present application, this embodiment is described mainly with reference to the example illustrated in FIG. 1. However, FIG. 1 is a diagram merely conceptually illustrating a structure of the MEA 1, and the present invention is not limited to specific modes, such as a size, a shape, and a positional relationship, of the MEA 1 and constituent elements of the MEA 1 illustrated in FIG. 1.

As illustrated in FIG. 1, the MEA 1 includes a pair of gas diffusion layers 30 and 50, an electrolyte membrane 20 arranged between the pair of gas diffusion layers 30 and 50, a cathode 10 arranged between the one gas diffusion layer 30 and the electrolyte membrane 20, and an anode 40 arranged between the other gas diffusion layer 50 and the electrolyte membrane 20.

Specifically, the cathode 10 is arranged between the electrolyte membrane 20 and the gas diffusion layer 30 in the MEA 1 or the battery. The cathode 10 includes a first layer (hereinafter referred to as "CC layer") 11 containing a carbon catalyst and a second layer (hereinafter referred to as "Pt layer") 12 containing platinum. That is, the cathode 10 includes a catalyst layer containing a catalyst, and the catalyst layer includes the CC layer 11 and the Pt layer 12.

In the cathode 10, the CC layer 11 and the Pt layer 12 are laminated. However, as described later, the cathode 10 may include another layer between the CC layer 11 and the Pt layer 12. The CC layer 11 is arranged between the gas diffusion layer 30 and the Pt layer 12 in the MEA 1 or the battery. That is, the cathode 10 includes the CC layer 11 at a position between the gas diffusion layer 30 and the Pt layer 12 in the MEA 1 or the battery. The Pt layer 12 is arranged between the electrolyte membrane 20 and the CC layer 11 in the MEA 1 or the battery. That is, the cathode 10 includes the Pt layer 12 at a position between the electrolyte membrane 20 and the CC layer 11 in the MEA 1 or the battery.

The CC layer 11 contains a carbon catalyst, which has activity for catalyzing an oxygen reduction reaction (hereinafter referred to as "oxygen reduction activity"), in an amount within a particular range. That is, the CC layer 11 contains 0.3 mg/cm$^2$ or more and 9.0 mg/cm$^2$ or less of the carbon catalyst. The content (mg/cm$^2$) of the carbon catalyst in the CC layer 11 is the weight (mg) of the carbon catalyst contained in the CC layer 11 per unit area (1 cm$^2$) of the CC layer 11. Thus, the content (mg/cm$^2$) of the carbon catalyst in the CC layer 11 is obtained by dividing the weight (mg) of the carbon catalyst contained in the CC layer 11 by an area (cm$^2$) of the CC layer 11 (area of a surface 11b of the CC layer 11 opposed to a surface 30a of the gas diffusion layer 30 in the example illustrated in FIG. 1).

There is no particular limitation on the content of the carbon catalyst in the CC layer 11 as long as the content falls within a range of 0.3 mg/cm$^2$ or more and 9.0 mg/cm$^2$ or less. The content may be, for example, 0.4 mg/cm$^2$ or more and 9.0 mg/cm$^2$ or less, 0.5 mg/cm$^2$ or more and 9.0 mg/cm$^2$ or less, 0.5 mg/cm$^2$ or more and 8.0 mg/cm$^2$ or less, or 0.7 mg/cm$^2$ or more and 8.0 mg/cm$^2$ or less.

When the content of the carbon catalyst in the CC layer 11 falls within the above-mentioned range, excellent catalytic activity and durability are achieved, for example, while gas diffusion efficiency in the CC layer 11 is maintained.

It is preferred that the catalyst contained in the CC layer 11 be mainly formed of the carbon catalyst, while the CC layer 11 may contain another catalyst. There is no particular limitation on the ratio of the content of the carbon catalyst to the content of the catalyst in the CC layer 11 (total of the content of the carbon catalyst and the content of the other catalyst when the CC layer 11 contains the other catalyst in addition to the carbon catalyst) as long as the effect of the present invention is obtained. For example, the ratio may be 50 wt % or more, preferably 70 wt % or more, more preferably 90 wt % or more, particularly preferably 95 wt % or more.

It should be noted that when a particular catalyst in the cathode 10 is formed of a support (e.g., a carbon support) and a catalyst component (e.g., a metal catalyst, such as platinum) supported on the support, for example, the content of the particular catalyst in the cathode 10 is the content of the catalyst component.

There is no particular limitation on the other catalyst contained in the CC layer 11 as long as the effect of the present invention is obtained. For example, the other catalyst may be one or more selected from the group consisting of a platinum-containing catalyst, a gold-containing catalyst, a ruthenium-containing catalyst, a rhodium-containing catalyst, a palladium-containing catalyst, an iridium-containing catalyst, a manganese-containing catalyst, and a cerium-containing catalyst. When the CC layer 11 contains a platinum-containing catalyst, the platinum-containing catalyst may be the same as or different from a platinum-containing catalyst contained in the Pt layer 12.

The CC layer 11 may be free of platinum. The CC layer 11 may be free of gold. The CC layer 11 may be free of ruthenium. The CC layer 11 may be free of rhodium. The CC layer 11 may be free of palladium. The CC layer 11 may be free of iridium. The CC layer 11 may be free of manganese. The CC layer 11 may be free of cerium. The CC layer 11 may be free of a catalyst other than the carbon catalyst.

The CC layer 11 may contain a component other than the catalyst. Specifically, the CC layer 11 contains, for example, an electrolyte material. There is no particular limitation on the electrolyte material as long as the electrolyte material has proton conductivity. For example, it is preferred that the electrolyte material be one or more selected from the group consisting of an ionomer and an ionic liquid. For example, it is preferred that the ionomer be one or more selected from the group consisting of a perfluorocarbon material and a hydrocarbon material. For example, it is preferred that the perfluorocarbon material be a perfluorocarbon sulfonic acid-based polymer. The perfluorocarbon sulfonic acid-based polymer is a perfluorocarbon material having a polytetrafluoroethylene skeleton and a sulfonic acid group. For example, it is preferred that the hydrocarbon material be a hydrocarbon sulfonic acid-based polymer. The hydrocarbon sulfonic acid-based polymer is a hydrocarbon material having a hydrocarbon skeleton and a sulfonic acid group.

Specifically, as the electrolyte material, for example, one or more selected from the group consisting of Nafion (trademark), Aquivion (trademark), Aciplex (trademark), and Flemion (trademark) are preferably used.

There is no particular limitation on the EW value of the electrolyte material contained in the CC layer 11 as long as the effect of the present invention is obtained. The EW value of the electrolyte material may be, for example, 300 or more and 1,100 or less. In this case, the EW value of the electrolyte material is preferably 400 or more and 1,100 or less, particularly preferably 500 or more and 1,100 or less. The EW value of the electrolyte material is an equivalent weight, and is grams of the electrolyte material in a dry state per mole of the sulfonic acid group.

There is no particular limitation on the ratio of the weight of the electrolyte material contained in the CC layer 11 to a remaining weight obtained by subtracting the weight of the electrolyte material from the weight of the CC layer 11 (=weight of the electrolyte material contained in the CC layer 11/(weight of the CC layer 11−weight of the electrolyte material contained in the CC layer 11)) (hereinafter referred to as "electrolyte material ratio" of the CC layer 11) as long as the effect of the present invention is obtained. The ratio may be, for example, 0.30 or more. In this case, the electrolyte material ratio of the CC layer 11 is preferably 0.40 or more, more preferably 0.50 or more, particularly preferably 0.60 or more.

For example, when the CC layer 11 is formed of the carbon catalyst and the electrolyte material, the remaining weight of the CC layer 11 is the weight of the carbon catalyst. Therefore, the electrolyte material ratio of the CC layer 11 is the ratio of the weight of the electrolyte material to the weight of the carbon catalyst. For example, when the CC layer 11 is formed of the carbon catalyst, the electrolyte material, and another component, the remaining weight of the CC layer 11 is a total of the weight of the carbon catalyst and the weight of the other component (that is, a total of the weights of the components other than the electrolyte material). Therefore, the electrolyte material ratio of the CC layer 11 is the ratio of the weight of the electrolyte material to the total of the weight of the carbon catalyst and the weight of the other component.

There is no particular limitation on an upper limit value of the electrolyte material ratio of the CC layer 11 as long as the effect of the present invention is obtained. The electrolyte material ratio may be, for example, 1.70 or less, preferably 1.60 or less, more preferably 1.50 or less.

The electrolyte material ratio of the CC layer 11 may be specified by appropriately combining: each of the above-mentioned lower limit values; and each of the above-mentioned upper limit values. Specifically, the electrolyte material ratio of the CC layer 11 may be, for example, 0.30 or more and 1.70 or less, preferably 0.40 or more and 1.60 or less, more preferably 0.50 or more and 1.50 or less, particularly preferably 0.60 or more and 1.50 or less.

When the electrolyte material ratio of the CC layer 11 falls within the above-mentioned range, excellent catalytic activity and durability are achieved, for example, while gas diffusion efficiency in the CC layer 11 is maintained.

There is no particular limitation on the ratio of a total of the weight of the carbon catalyst contained in the CC layer 11 and the weight of the electrolyte material contained in the CC layer 11 to the weight of the CC layer 11 (for example, when the CC layer 11 is formed of the carbon catalyst, the electrolyte material, and further, the other component, a total of the weight of the carbon catalyst, the weight of the electrolyte material, and the weight of the other component) as long as the ratio falls within a range in which the effect of the present invention is obtained. The ratio may be, for example, 50 wt % or more, preferably 70 wt % or more, more preferably 80 wt % or more, particularly preferably 90 wt % or more.

The CC layer 11 may contain another conductive material in addition to the carbon catalyst. There is no particular limitation on the other conductive material as long as the effect of the present invention is obtained. For example, the other conductive material is preferably one or more selected from the group consisting of a conductive carbon material, a conductive ceramic, titanium oxide, tin oxide, niobium-doped tin oxide, and antimony-doped tin oxide, and is particularly preferably a conductive carbon material. There is no particular limitation on the conductive carbon material as long as the conductive carbon material is a carbon material having conductivity. The conductive carbon material may be, for example, one or more kinds selected from the group consisting of carbon black, graphite, a carbon nanotube, a carbon nanohorn, a carbon fiber, a carbon fibril, fullerene, and graphene. There is no particular limitation on the conductive ceramic as long as the conductive ceramic is a ceramic having conductivity. For example, the conductive ceramic is preferably one or more selected from the group consisting of alumina, silica, and cordierite.

The CC layer 11 may contain a water retention material. There is no particular limitation on the water retention material as long as the effect of the present invention is obtained. For example, it is preferred that the water retention material be silica. The CC layer 11 may be free of a conductive material other than the carbon catalyst. The CC layer 11 may be free of a carbon material other than the carbon catalyst. The CC layer 11 may be free of the water retention material.

There is no particular limitation on the ratio of the weight of the carbon catalyst contained in the CC layer 11 to the remaining weight obtained by subtracting the weight of the electrolyte material from the weight of the CC layer 11 (for example, when the CC layer 11 is formed of the carbon catalyst, the electrolyte material, the other conductive material, and the water retention material, a total of the weight of the carbon catalyst, the weight of the other conductive material, and the weight of the water retention material) as long as the ratio falls within a range in which the effect of the present invention is obtained. The ratio may be, for example, 50 wt % or more, preferably 60 wt % or more, more preferably 70 wt % or more, particularly preferably 80 wt % or more.

There is no particular limitation on the thickness of the CC layer 11 as long as the effect of the present invention is obtained. The thickness of the CC layer 11 may be, for example, 1 μm or more and 100 μm or less, preferably 3 μm or more and 80 μm or less, particularly preferably 5 μm or more and 60 μm or less.

The Pt layer 12 contains a platinum-containing catalyst. There is no particular limitation on the platinum-containing catalyst as long as the platinum-containing catalyst is a catalyst containing platinum and/or a platinum alloy. That is, the platinum-containing catalyst contains, for example, platinum particles and/or platinum alloy particles. The platinum-containing catalyst may contain a support and platinum particles and/or platinum alloy particles supported on the support.

In this case, there is no particular limitation on the support as long as the effect of the present invention is obtained. The support may be, for example, one or more selected from the group consisting of a carbon material, a ceramic (e.g., one or more selected from the group consisting of alumina, silica, and cordierite), titanium oxide, tin oxide, niobium-doped tin oxide, and antimony-doped tin oxide, and is preferably a carbon material.

There is no particular limitation on the carbon material as long as the effect of the present invention is obtained. The carbon material is preferably a conductive carbon material. Specifically, the carbon material is preferably, for example, one or more selected from the group consisting of carbon black (e.g., ketjen black and/or Vulcan), a carbon nanotube, a carbon fiber, graphite, graphite oxide, graphene, and activated carbon. The platinum-containing catalyst may be platinum particles and/or platinum alloy particles free from a support.

There is no particular limitation on the platinum alloy as long as the platinum alloy is an alloy of platinum and another metal. The platinum alloy is preferably an alloy of platinum and one or more selected from the group consisting of nickel, cobalt, ruthenium, palladium, niobium, and iron.

The platinum-containing catalyst may be a core-shell type catalyst including a core formed of a metal other than platinum and the platinum alloy and a shell formed of platinum and/or the platinum alloy covering the core. The platinum-containing catalyst may be a nanostructured thin film (NSTF) type catalyst including a base material (e.g., a whisker) formed of a metal other than platinum and the platinum alloy, and platinum and/or the platinum alloy laminated on the base material. The platinum-containing catalyst may be a catalyst having a nanoframe structure formed of platinum and/or the platinum alloy.

The Pt layer 12 contains platinum in an amount within a particular range. Specifically, the Pt layer 12 contains 0.002 mg/cm$^2$ or more and 0.190 mg/cm$^2$ or less of platinum. The content (mg/cm$^2$) of platinum in the Pt layer 12 is the weight (mg) of platinum contained in the Pt layer 12 per unit area (1 cm$^2$) of the Pt layer 12. Thus, the content (mg/cm$^2$) of platinum in the Pt layer 12 is obtained by dividing the weight (mg) of platinum contained in the Pt layer 12 by an area (cm$^2$) of the Pt layer 12 (area of a surface 12a of the Pt layer 12 opposed to a surface 20b of the electrolyte membrane 20, the surface 20b being facing the gas diffusion layer 30, in the example illustrated in FIG. 1). For example, when the platinum-containing catalyst of the Pt layer 12 contains a support and platinum supported on the support, the weight of platinum contained in the Pt layer 12 is the weight of the platinum. When the platinum-containing catalyst contains the platinum alloy, the weight of platinum contained in the Pt layer 12 is the weight of platinum contained in the platinum alloy.

There is no particular limitation on the content of platinum in the Pt layer 12 as long as the content falls within a range of 0.002 mg/cm$^2$ or more and 0.190 mg/cm$^2$ or less. The content may be, for example, 0.003 mg/cm$^2$ or more and 0.190 mg/cm$^2$ or less, 0.003 mg/cm$^2$ or more and 0.170 mg/cm$^2$ or less, 0.003 mg/cm$^2$ or more and 0.150 mg/cm$^2$ or less.

When the content of platinum in the Pt layer 12 falls within the above-mentioned range, excellent catalytic activity and durability are achieved, for example, in a state in which the catalytic activity of the cathode 10 does not largely depend on the platinum-containing catalyst of the Pt layer 12.

It is preferred that the catalyst contained in the Pt layer 12 be mainly formed of platinum, while the Pt layer 12 may contain another catalyst. There is no particular limitation on the ratio of the content of platinum in the Pt layer 12 to the content of the catalyst in the Pt layer 12 (when the Pt layer 12 contains the other catalyst in addition to the platinum-containing catalyst formed of a support and platinum supported on the support, a total of the content of platinum of the platinum-containing catalyst and the content of the other catalyst) as long as the effect of the present invention is obtained. The ratio may be, for example, 25 wt % or more, preferably 50 wt % or more, more preferably 75 wt % or more, particularly preferably 90 wt % or more.

There is no particular limitation on the other catalyst contained in the Pt layer 12 as long as the effect of the present invention is obtained. For example, the other catalyst may be one or more selected from the group consisting of a carbon catalyst, a gold-containing catalyst, a ruthenium-containing catalyst, a rhodium-containing catalyst, a palladium-containing catalyst, an iridium-containing catalyst, a manganese-containing catalyst, and a cerium-containing catalyst. When the Pt layer 12 contains a carbon catalyst, there is no particular limitation on the carbon catalyst as long as the carbon catalyst has oxygen reduction activity. The carbon catalyst may be the same as or different from the carbon catalyst contained in the CC layer 11.

The Pt layer 12 may be free of the carbon catalyst. The Pt layer 12 may be free of gold. The Pt layer 12 may be free of ruthenium. The Pt layer 12 may be free of rhodium. The Pt layer 12 may be free of palladium. The Pt layer 12 may be free of iridium. The Pt layer 12 may be free of manganese. The Pt layer 12 may be free of cerium. The Pt layer 12 may be free of a catalyst other than the platinum-containing catalyst.

The Pt layer 12 may contain a component other than the catalyst. Specifically, the Pt layer 12 contains, for example, an electrolyte material. There is no particular limitation on the electrolyte material as long as the electrolyte material has proton conductivity. For example, it is preferred that the electrolyte material be one or more selected from the group consisting of an ionomer and an ionic liquid. For example, it is preferred that the ionomer be one or more selected from the group consisting of a perfluorocarbon material and a hydrocarbon material. For example, it is preferred that the perfluorocarbon material be a perfluorocarbon sulfonic acid-based polymer. For example, it is preferred that the hydrocarbon material be a hydrocarbon sulfonic acid-based polymer.

Specifically, as the electrolyte material, for example, one or more selected from the group consisting of Nafion (trademark), Aquivion (trademark), Aciplex (trademark), and Flemion (trademark) are preferably used.

There is no particular limitation on the EW value of the electrolyte material contained in the Pt layer 12 as long as the effect of the present invention is obtained. The EW value of the electrolyte material may be, for example, 300 or more and 1,100 or less. In this case, the EW value of the electrolyte material is preferably 400 or more and 1,100 or less, particularly preferably 500 or more and 1,100 or less.

There is no particular limitation on the ratio of the weight of the electrolyte material contained in the Pt layer 12 to a remaining weight obtained by subtracting the weight of the electrolyte material from the weight of the Pt layer 12 (=weight of the electrolyte material contained in the Pt layer 12/(weight of the Pt layer 12−weight of the electrolyte material contained in the Pt layer 12)) (hereinafter referred to as "electrolyte material ratio" of the Pt layer 12) as long as the effect of the present invention is obtained. The ratio may be, for example, 0.05 or more. In this case, the electrolyte material ratio of the Pt layer 12 is preferably 0.10 or more, particularly preferably 0.15 or more.

For example, when the Pt layer 12 is formed of the platinum-containing catalyst and the electrolyte material, the remaining weight of the Pt layer 12 is the weight of the platinum-containing catalyst (when the platinum-containing catalyst is formed of a support and platinum supported on the support, a total of the weight of the support and the weight of platinum). Therefore, the electrolyte material ratio of the Pt layer 12 is the ratio of the weight of the electrolyte material to the weight of the platinum-containing catalyst. In addition, for example, when the Pt layer 12 is formed of the platinum-containing catalyst, the electrolyte material, and another component, the remaining weight of the Pt layer 12 is a total of the weight of the platinum-containing catalyst and the weight of the other component (that is, a total of the weights of the components other than the electrolyte material). Therefore, the electrolyte material ratio of the Pt layer 12 is the ratio of the weight of the electrolyte material to a total of the weight of the platinum-containing catalyst and the weight of the other component.

There is no particular limitation on an upper limit value of the electrolyte material ratio of the Pt layer 12 as long as the effect of the present invention is obtained. The electrolyte material ratio may be, for example, 1.40 or less, preferably 1.30 or less, more preferably 1.20 or less, particularly preferably 1.10 or less.

The electrolyte material ratio of the Pt layer 12 may be specified by appropriately combining: each of the above-mentioned lower limit values; and each of the above-mentioned upper limit values. Specifically, the electrolyte material ratio of the Pt layer 12 may be, for example, 0.05 or more and 1.40 or less, preferably 0.05 or more and 1.30 or less, more preferably 0.10 or more and 1.20 or less, particularly preferably 0.15 or more and 1.10 or less.

When the electrolyte material ratio of the Pt layer 12 falls within the above-mentioned range, excellent catalytic activity and durability are achieved, for example, while gas diffusion efficiency in the Pt layer 12 is maintained.

There is no particular limitation on the ratio of a total of the weight of the platinum-containing catalyst contained in the Pt layer 12 and the weight of the electrolyte material contained in the Pt layer 12 to the weight of the Pt layer 12 (for example, when the Pt layer 12 is formed of the platinum-containing catalyst, the electrolyte material, and further, another component, a total of the weight of the platinum-containing catalyst, the weight of the electrolyte material, and the weight of the other component) as long as the effect of the present invention is obtained. The ratio may be, for example, 20 wt % or more, preferably 40 wt % or more, more preferably 60 wt % or more, particularly preferably 80 wt % or more.

The Pt layer 12 may contain another conductive material in addition to the platinum-containing catalyst. There is no particular limitation on the other conductive material as long as the effect of the present invention is obtained. For example, the other conductive material is preferably one or more selected from the group consisting of a conductive carbon material, a conductive ceramic, titanium oxide, tin oxide, niobium-doped tin oxide, and antimony-doped tin oxide, and is particularly preferably a conductive carbon material. There is no particular limitation on the conductive carbon material as long as the conductive carbon material is a carbon material having conductivity. The conductive carbon material may be, for example, one or more kinds selected from the group consisting of carbon black, graphite, a carbon nanotube, a carbon nanohorn, a carbon fiber, a carbon fibril, fullerene, and graphene. There is no particular limitation on the conductive ceramic as long as the conductive ceramic is a ceramic having conductivity. For example, the conductive ceramic is preferably one or more selected from the group consisting of alumina, silica, and cordierite.

The Pt layer 12 may contain a water retention material. There is no particular limitation on the water retention material as long as the effect of the present invention is obtained. For example, it is preferred that the water retention material be silica. The Pt layer 12 may be free of a carbon material other than the carbon catalyst. The Pt layer 12 may be free of a conductive material other than the platinum-containing catalyst. The Pt layer 12 may be free of the water retention material.

There is no particular limitation on the ratio of the weight of the platinum-containing catalyst contained in the Pt layer 12 to the remaining weight obtained by subtracting the weight of the electrolyte material from the weight of the Pt layer 12 (for example, when the Pt layer 12 is formed of the platinum-containing catalyst, the electrolyte material, the other conductive material, and the water retention material, a total of the weight of the platinum-containing catalyst, the weight of the other conductive material, and the weight of the water retention material) as long as the ratio falls within a range in which the effect of the present invention is obtained. The ratio may be, for example, 20 wt % or more, preferably 40 wt % or more, more preferably 60 wt % or more, particularly preferably 80 wt % or more.

There is no particular limitation on the thickness of the Pt layer 12 as long as the effect of the present invention is obtained. The thickness of the Pt layer 12 may be, for example, 0.1 μm or more and 50 μm or less, preferably 0.5 μm or more and 20 μm or less, particularly preferably 1 μm or more and 10 μm or less.

In the cathode 10, the composition of the catalyst of the CC layer 11 is different from that of the Pt layer 12. That is, when the CC layer 11 contains the carbon catalyst in an amount equal to or more than any of the above-mentioned lower limit values (mg/cm$^2$), the content of the carbon catalyst in the Pt layer 12 may be less than the lower limit value. When the Pt layer 12 contains platinum in an amount equal to or more than any of the above-mentioned lower limit values (mg/cm$^2$), the content of platinum in the CC layer 11 may be less than the lower limit value.

When the ratio of the content of the carbon catalyst in the CC layer 11 to the content of the catalyst in the CC layer 11 is equal to or more than any of the above-mentioned lower limit values (wt %), the ratio of the content of the carbon catalyst in the Pt layer 12 to the content of the catalyst in the Pt layer 12 may be less than the lower limit value. When the ratio of the content of platinum in the Pt layer 12 to the content of the catalyst in the Pt layer 12 is equal to or more than any of the above-mentioned lower limit values (wt %), the ratio of the content of platinum in the CC layer 11 to the content of the catalyst in the CC layer 11 may be less than the lower limit value.

It is preferred that the catalyst of the cathode 10 be mainly formed of the carbon catalyst and platinum. That is, the ratio of a total of the content of the carbon catalyst and the content of platinum in the cathode 10 to the content of the catalyst in the cathode 10 (for example, when the cathode 10 is formed of the CC layer 11 and the Pt layer 12, a total of the content of the catalyst in the CC layer 11 and the content of the catalyst in the Pt layer 12) may be, for example, 50 wt % or more, preferably 80 wt % or more, particularly preferably 90 wt % or more.

It is preferred that the carbon catalyst of the cathode 10 be mainly formed of the carbon catalyst of the CC layer 11. That is, the ratio of the content of the carbon catalyst in the CC layer 11 to the content of the carbon catalyst in the cathode 10 (for example, when both of the CC layer 11 and the Pt layer 12 contain the carbon catalyst, a total of the content of the carbon catalyst in the CC layer 11 and the content of the carbon catalyst in the Pt layer 12) may be, for example, 50 wt % or more, preferably 80 wt % or more, particularly preferably 90 wt % or more.

It is preferred that platinum of the cathode 10 be mainly formed of platinum of the Pt layer 12. That is, the ratio of the content of platinum in the Pt layer 12 to the content of platinum in the cathode 10 (for example, when both of the CC layer 11 and the Pt layer 12 contain platinum, a total of the content of platinum in the CC layer 11 and the content of platinum in the Pt layer 12) may be, for example, 10 wt % or more, preferably 30 wt % or more, particularly preferably 50 wt % or more.

It is preferred that the oxygen reduction activity of the cathode 10 be mainly exhibited by the carbon catalyst contained in the CC layer 11. That is, it is preferred that the content of platinum in the cathode 10 be suppressed to such a degree that the oxygen reduction activity of the cathode 10 does not largely depend on the platinum-containing catalyst of the cathode 10. Platinum is liable to be poisoned compared to the carbon catalyst, and hence, in the case where the oxygen reduction activity of the cathode 10 largely depends on the platinum-containing catalyst, the performance of the battery may be abruptly decreased when the platinum-containing catalyst is poisoned. Meanwhile, in the case where the oxygen reduction activity of the cathode 10 is mainly exhibited by the carbon catalyst without largely depending on the platinum-containing catalyst, the abrupt decrease in performance of the battery is prevented even when the platinum-containing catalyst is poisoned.

In this respect, the ratio of the content (mg/cm$^2$) of platinum in the Pt layer 12 to the content (mg/cm$^2$) of the carbon catalyst in the CC layer 11 (hereinafter referred to as "Pt/CC ratio") may be, for example, 20.00 wt % or less.

In this case, the Pt/CC ratio of the cathode 10 is preferably 7.00 wt % or less, more preferably 4.80 wt % or less, still more preferably 3.80 wt % or less, particularly preferably 2.80 wt % or less.

There is no particular limitation on a lower limit value of the Pt/CC ratio of the cathode 10 as long as the effect of the present invention is obtained. The Pt/CC ratio may be, for example, 0.10 wt % or more, preferably 0.15 wt % or more.

The Pt/CC ratio may be specified by appropriately combining: each of the above-mentioned lower limit values; and each of the above-mentioned upper limit values. Specifically, the Pt/CC ratio of the cathode 10 may be, for example, 0.10 wt % or more and 20.00 wt % or less, preferably 0.15 wt % or more and 7.00 wt % or less, more preferably 0.15 wt % or more and 4.80 wt % or less, still more preferably 0.15 wt % or more and 3.80 wt % or less, particularly preferably 0.15 wt % or more and 2.80 wt % or less.

In the cathode 10, the thickness of the Pt layer 12 may be smaller than that of the CC layer 11. That is, the ratio of the thickness (μm) of the Pt layer 12 to the thickness (μm) of the CC layer 11 may be, for example, 1% or more and 99% or less, preferably 2% or more and 75% or less, particularly preferably 2% or more and 50% or less.

In the example of FIG. 1, the thickness of the CC layer 11 is the distance between a surface 11a of the CC layer 11 facing the electrolyte membrane 20 (that is, facing the Pt layer 12) and the surface 11b of the CC layer 11 facing the gas diffusion layer 30. The thickness of the Pt layer 12 is the distance between the surface 12a of the Pt layer 12 facing the electrolyte membrane 20 and a surface 12b of the Pt layer 12 facing the gas diffusion layer 30 (that is, facing the CC layer 11).

The Pt layer 12 is configured to cover part or the entirety of the surface 11a of the CC layer 11 facing the electrolyte membrane 20. In this respect, the Pt layer 12 may be configured to cover an area of 30% or more, preferably 70% or more, particularly preferably 90% or more of the surface 11a of the CC layer 11 facing the electrolyte membrane 20.

While the cathode 10 includes the CC layer 11 and the Pt layer 12 laminated on the CC layer 11, the cathode 10 may further include another layer arranged at one or more positions selected from the group consisting of a position between the CC layer 11 and the Pt layer 12, a position between the CC layer 11 and the gas diffusion layer 30, and a position between the Pt layer 12 and the electrolyte membrane 20. It is preferred that the catalyst layer of the cathode 10 be mainly formed of the CC layer 11 and the Pt layer 12.

The ratio of a total of the thickness of the CC layer 11 and the thickness of the Pt layer 12 to the thickness of the catalyst layer of the cathode 10 (for example, when the catalyst layer of the cathode 10 is formed of the CC layer 11, the Pt layer 12, and the other layer, a total of the thickness of the CC layer 11, the thickness of the Pt layer 12, and the thickness of the other layer) may be, for example, 50% or more, preferably 70% or more, particularly preferably 90% or more.

When the CC layer 11 contains the carbon catalyst in an amount (mg/cm$^2$) within the above-mentioned particular range, the cathode 10 need not include another layer having a content of the carbon catalyst outside the particular range arranged at one or more positions selected from the group consisting of a position between the CC layer 11 and the Pt layer 12, a position between the CC layer 11 and the gas diffusion layer 30, and a position between the Pt layer 12 and the electrolyte membrane 20.

When the Pt layer 12 contains platinum in an amount (mg/cm$^2$) within the above-mentioned particular range, the cathode 10 need not include another layer having a content of platinum outside the particular range arranged at one or more positions selected from the group consisting of a position between the CC layer 11 and the Pt layer 12, a position between the CC layer 11 and the gas diffusion layer 30, and a position between the Pt layer 12 and the electrolyte membrane 20.

The cathode 10 need not include another layer containing a catalyst (e.g., another layer containing a catalyst and an electrolyte material) arranged at one or more positions selected from the group consisting of a position between the CC layer 11 and the Pt layer 12, a position between the CC layer 11 and the gas diffusion layer 30, and a position between the Pt layer 12 and the electrolyte membrane 20.

The cathode 10 need not include another layer free of a catalyst (e.g., another layer containing an electrolyte material but not containing a catalyst) arranged at one or more positions selected from the group consisting of a position between the CC layer 11 and the Pt layer 12, a position between the CC layer 11 and the gas diffusion layer 30, and a position between the Pt layer 12 and the electrolyte membrane 20.

The cathode 10 need not include another layer (e.g., another layer containing an electrolyte material) arranged at one or more positions selected from the group consisting of a position between the CC layer 11 and the Pt layer 12, a position between the CC layer 11 and the gas diffusion layer 30, and a position between the Pt layer 12 and the electrolyte membrane 20. That is, in this case, the catalyst layer of the cathode 10 is formed of the CC layer 11 and the Pt layer 12.

In the cathode 10, it is preferred that the distance between the CC layer 11 and the Pt layer 12 be small. That is, the distance between the CC layer 11 and the Pt layer 12 (for example, in the example illustrated in FIG. 1, a distance between the surface 11a of the CC layer 11 facing the electrolyte membrane 20 and the surface 12b of the Pt layer 12 facing the gas diffusion layer 30) may be, for example, 20 µm or less, preferably 10 µm or less, particularly preferably 5 µm or less.

It is preferred that the CC layer 11 and the Pt layer 12 be brought into contact with each other. That is, it is preferred that the surface 11a of the CC layer 11 facing the electrolyte membrane 20 and the surface 12b of the Pt layer 12 facing the gas diffusion layer 30 be brought into contact with each other.

The cathode 10 may be arranged on a base material. In this case, the cathode 10 arranged on the base material includes the CC layer 11 containing the carbon catalyst in an amount within any of the above-mentioned particular ranges and the Pt layer 12 containing platinum in an amount within any of the above-mentioned particular ranges, the Pt layer 12 being arranged between the CC layer 11 and the base material or on a side of the base material opposite to the CC layer 11. That is, in this case, a cathode structure including the base material and the cathode 10 arranged on the base material is formed.

There is no particular limitation on the base material as long as the base material enables the MEA 1 or the battery including the cathode 10 to be manufactured. For example, it is preferred that the base material be the electrolyte membrane 20, the gas diffusion layer 30, or a base material for transfer.

Specifically, the cathode 10 arranged on the gas diffusion layer 30 may include the CC layer 11 and the Pt layer 12 arranged on the side of the CC layer 11 opposite to the gas diffusion layer 30. The cathode 10 arranged on the electrolyte membrane 20 may include the CC layer 11 and the Pt layer 12 arranged between the CC layer 11 and the electrolyte membrane 20. The cathode 10 arranged on the base material for transfer may include the CC layer 11 and the Pt layer 12 arranged between the CC layer 11 and the base material for transfer or the Pt layer 12 arranged on the side of the CC layer 11 opposite to the base material for transfer.

When the cathode 10 is arranged on the base material for transfer, for example, first, the cathode 10 is formed on the base material for transfer. After that, in manufacturing of the MEA 1 or the battery including the cathode 10, the cathode 10 is transferred from the base material for transfer onto the electrolyte membrane 20 or the gas diffusion layer 30 included in the MEA 1 or the battery. There is no particular limitation on the base material for transfer as long as the base material for transfer enables the cathode 10 to be transferred. For example, it is preferred that the base material for transfer be a resin film or a metal film.

The cathode 10 is manufactured by a method including forming the CC layer 11 and the Pt layer 12. The CC layer 11 is formed by coating and drying a composition (hereinafter referred to as "CC layer composition") which contains a carbon catalyst and has fluidity. The Pt layer 12 is formed by coating and drying a composition (hereinafter referred to as "Pt layer composition") which contains a platinum-containing catalyst and has fluidity.

Specifically, for example, first, the CC layer composition is applied onto the base material (e.g., the gas diffusion layer 30 or the base material for transfer), followed by being dried, to thereby form the CC layer 11, and then, the Pt layer composition is applied onto the CC layer 11, followed by being dried, to thereby form the Pt layer 12. Alternatively, for example, first, the Pt layer composition is applied onto the base material (e.g., the electrolyte membrane 20 or the base material for transfer), followed by being dried, to thereby form the Pt layer 12, and then, the CC layer composition is applied onto the Pt layer 12, followed by being dried, to thereby form the CC layer 11. Alternatively, for example, the following may be performed. First, the CC layer composition is applied onto a first base material (e.g., the gas diffusion layer 30 or the base material for transfer), followed by being dried, to thereby form the CC layer 11. On the other hand, the Pt layer composition is applied onto a second base material (e.g., the electrolyte membrane 20 or the base material for transfer), followed by being dried, to thereby form the Pt layer 12. Then, the first base material and the second base material are pressure-bonded to each other so that the CC layer 11 and the Pt layer 12 are laminated.

The CC layer 11 may be formed by coating the CC layer composition only once or by coating the CC layer composition a plurality of times (that is, through recoating). The content of the carbon catalyst in the CC layer composition and/or the application amount and/or number of times of application of the CC layer composition is adjusted so that the CC layer 11 to be formed finally contains the carbon catalyst in an amount within the above-mentioned particular range.

Similarly, the Pt layer 12 may be formed by applying the Pt layer composition only once or by applying the Pt layer composition a plurality of times. The content of platinum in the Pt layer composition and/or the application amount and/or number of times of application of the Pt layer composition is adjusted so that the Pt layer 12 to be formed finally contains platinum in an amount within the above-mentioned particular range.

When the cathode 10 includes the other layer in addition to the CC layer 11 and the Pt layer 12, the method of manufacturing the cathode 10 further includes forming the other layer. The other layer is formed by coating and drying a composition which contains a component corresponding to the composition of the other layer and has fluidity in the same manner as in the cases of the CC layer 11 and the Pt layer 12.

The surfaces 11a and 11b of the CC layer 11 and the surfaces 12a and 12b of the Pt layer 12 may be specified by forming steps therefor. That is, for example, when the CC layer 11 is formed by coating the CC layer composition onto the surface 30a of the gas diffusion layer 30 once or a plurality of times, a surface formed by finally applying the CC layer composition serves as the surface 11a of the CC layer 11 facing the electrolyte membrane 20.

For example, when the Pt layer 12 is first formed, and then, the CC layer 11 is formed by applying the CC layer composition to a position at the gas diffusion layer 30 side of the Pt layer 12 once or a plurality of times, a surface of a layer formed by first applying the CC layer composition after forming the Pt layer 12, the surface facing the Pt layer 12, serves as the surface 11a of the CC layer 11 facing the electrolyte membrane 20.

The MEA 1 includes the cathode 10, the anode 40, and the electrolyte membrane 20 arranged between the cathode 10 and the anode 40. More specifically, for example, the MEA 1 includes the pair of gas diffusion layers 30 and 50, the electrolyte membrane 20 arranged between the pair of gas diffusion layers 30 and 50, the cathode 10 arranged between the one gas diffusion layer 30 and the electrolyte membrane 20, and the anode 40 arranged between the other gas diffusion layer 50 and the electrolyte membrane 20, and the cathode 10 includes the CC layer 11 and the Pt layer 20 arranged between the CC layer 11 and the electrolyte membrane 20.

There is no particular limitation on the gas diffusion layers 30 and 50 as long as the gas diffusion layers 30 and 50 are each formed of a porous body that enables a gas, such as air, to be supplied to the cathode 10 and enables a fuel, such as hydrogen, to be supplied to the anode 40. The gas diffusion layers 30 and 50 may be known gas diffusion layers used in a battery, such as a fuel cell. The gas diffusion layers 30 and 50 may include, for example, carbon paper and/or carbon cloth.

The gas diffusion layers 30 and 50 may include a microporous layer arranged between the gas diffusion layer 30 and the cathode 10 and/or a microporous layer arranged between the gas diffusion layer 50 and the anode 40 in order to perform water management and the like. There is no particular limitation on the microporous layer as long as the effect of the present invention is obtained. The microporous layer may be a known microporous layer used for the gas diffusion layer included in a battery, such as a fuel cell.

There is no particular limitation on the electrolyte membrane 20 as long as the electrolyte membrane 20 is a polymer membrane having proton conductivity. The electrolyte membrane 20 may be a known electrolyte membrane used in a battery, such as a fuel cell, preferably an ionomer membrane. For example, it is preferred that the ionomer be one or more selected from the group consisting of a perfluorocarbon material and a hydrocarbon material. For example, it is preferred that the perfluorocarbon material be a perfluorocarbon sulfonic acid-based polymer. For example, it is preferred that the hydrocarbon material be a hydrocarbon sulfonic acid-based polymer.

Specifically, as the electrolyte membrane 20, for example, one or more membranes selected from the group consisting of Nafion (trademark), Aquivion (trademark), Aciplex (trademark), and Flemion (trademark) are preferably used. It is preferred that the electrolyte membrane 20 be a solid polymer electrolyte membrane.

There is no particular limitation on the thickness of the electrolyte membrane 20 as long as the effect of the present invention is obtained. The thickness of the electrolyte membrane 20 may be, for example, 1 μm or more and 100 μm or less, preferably 5 μm or more and 50 μm or less, particularly preferably 8 μm or more and 30 μm or less.

There is no particular limitation on the anode 40 as long as the anode 40 contains a catalyst having oxidation reaction activity for a fuel and/or a microorganism having oxidation decomposition ability for a fuel. The fuel to be supplied to the anode 40 may be, for example, one or more selected from the group consisting of hydrogen, hydrocarbon compounds (e.g., methane and/or ethane), alcohols (e.g., methanol and/or ethanol), carboxylic acid compounds (e.g., formic acid and/or acetic acid), sugars (e.g., glucose), nitrogen-containing compounds (e.g., ammonia and/or hydrazine), and other organic matter (e.g., organic matter in sludge or industrial drainage).

For example, it is preferred that the catalyst of the anode 40 be one or more selected from the group consisting of a platinum-containing catalyst, a ruthenium-containing catalyst, a rhodium-containing catalyst, a palladium-containing catalyst, an iridium-containing catalyst, a nickel-containing catalyst, a cobalt-containing catalyst, and an iron-containing catalyst. There is no particular limitation on the microorganism of the anode 40 as long as the microorganism has oxidation decomposition ability for a fuel.

The content of the catalyst in the anode 40 may be, for example, 0.001 mg/cm$^2$ or more and 0.5 mg/cm$^2$ or less, preferably 0.005 mg/cm$^2$ or more and 0.3 mg/cm$^2$ or less.

For example, when the catalyst contained in the anode 40 is formed of a support (e.g., a carbon support) and a catalyst component (e.g., a metal catalyst, such as platinum) supported on the support, the content of the catalyst in the anode 40 is the content of the catalyst component.

The anode 40 may contain an electrolyte material. As the electrolyte material, the same electrolyte material as that contained in the cathode 10 described above is preferably used. The kind of electrolyte contained in a catalyst layer of the anode 40 may be the same as or different from that of an electrolyte contained in the catalyst layer (e.g., the CC layer 11 and/or the Pt layer 12) of the cathode 10.

The battery includes the cathode 10 or the MEA 1. The battery includes, for example, the cathode 10 and the anode 40. Specifically, the battery may include the cathode 10, the anode 40, and the electrolyte membrane 20 arranged between the cathode 10 and the anode 40.

The battery includes, for example, a pair of separators and the MEA 1 arranged between the pair of separators. In this case, the battery includes a unit cell, and the unit cell may include a pair of separators and the MEA 1 arranged between the pair of separators. The battery may include one or more unit cells. That is, the battery may include one unit cell or a plurality of unit cells. The battery may include a plurality of stacked unit cells.

There is no particular limitation on the separator as long as the separator has corrosion resistance and conductivity, and the effect of the present invention is obtained. The separator may be a known separator used in a battery, such as a fuel cell. Specifically, as the separator, for example, a carbon separator having corrosion resistance and conductivity is preferably used.

There is no particular limitation on the battery as long as the effect of the present invention is obtained. The battery may be, for example, a fuel cell (e.g., a polymer electrolyte fuel cell), an air battery, a redox flow battery, or a halogen battery, preferably a fuel cell, particularly preferably a polymer electrolyte fuel cell (PEFC).

In the MEA 1 or the battery, it is preferred that the distance between the CC layer 11 of the cathode 10 and the gas diffusion layer 30 be small. That is, the distance between the CC layer 11 and the gas diffusion layer 30 (for example, in the example illustrated in FIG. 1, the distance between the surface 11b of the CC layer 11 facing the gas diffusion layer 30 and the surface 30a of the gas diffusion layer 30 facing the electrolyte membrane 20) may be, for example, 20 μm or less, preferably 10 μm or less, particularly preferably 5 μm of less.

In the MEA 1 or the battery, it is preferred that the CC layer 11 of the cathode 10 and the gas diffusion layer 30 be brought into contact with each other. That is, it is preferred that the surface 11b of the CC layer 11 facing the gas diffusion layer 30 and the surface 30a of the gas diffusion layer 30 facing the electrolyte membrane 20 be brought into contact with each other.

In the MEA 1 or the battery, it is preferred that the distance between the Pt layer 12 of the cathode 10 and the electrolyte membrane 20 be small. That is, the distance between the Pt layer 12 and the electrolyte membrane 20 (for example, in the example illustrated in FIG. 1, the distance between the surface 12a of the Pt layer 12 facing the electrolyte membrane 20 and the surface 20b of the electrolyte membrane 20 facing the Pt layer 12) may be, for example, 20 μm or less, preferably 10 μm or less, particularly preferably 5 μm of less.

In the MEA 1 or the battery, it is preferred that the Pt layer 12 of the cathode 10 and the electrolyte membrane 20 be brought into contact with each other. That is, the surface 12a of the Pt layer 12 facing the electrolyte membrane 20 and the surface 20b of the electrolyte membrane 20 facing the gas diffusion layer 30 may be brought into contact with each other.

There is no particular limitation on the carbon catalyst contained in the CC layer 11 as long as the effect of the present invention is obtained. It is particularly preferred that the carbon catalyst be a particular carbon catalyst, which contains iron, exhibits a weight reduction rate at 200° C. to 1,200° C. of 12.0 wt % or less measured by thermogravimetric analysis in a nitrogen atmosphere, and has a carbon structure that exhibits, in X-ray absorption fine structure (XAFS) analysis of a K absorption edge of the iron, the following (a) and/or (b): (a) a ratio of a normalized absorbance at 7,130 eV to a normalized absorbance at 7,110 eV is 7.0 or more; and (b) a ratio of a normalized absorbance at 7,135 eV to a normalized absorbance at 7,110 eV is 7.0 or more. The normalized absorbance in the XAFS analysis refers to an absorbance normalized so that the absorbance before an absorption edge is converged to 0 and the absorbance after the absorption edge is converged to 1.

The inventors of the present invention have undertaken extensive investigations on technical means for obtaining a carbon catalyst for achieving a cathode, a MEA, and a battery, each having excellent durability, and as a result, have uniquely found that a carbon catalyst, which contains iron and exhibits a weight reduction rate equal to or less than a particular threshold value measured by thermogravimetric analysis, and which has a carbon structure containing a large amount of iron in a particular state in X-ray absorption fine structure analysis of a K absorption edge of the iron, contributes to the excellent durability.

As described later, the carbon catalyst contains iron derived from a raw material for carbonization at the time of production thereof. Specifically, the carbonization of a raw material containing iron results in the carbon catalyst containing iron inside. Therefore, even when the carbon catalyst is produced through metal removal treatment described later, a trace amount of iron derived from the raw material remains in the carbon catalyst.

Specifically, for example, in the case where the carbon catalyst has a particle shape, when a particle forming the carbon catalyst is cut, iron is detected in a cross section of the particle exposed by cutting. The iron contained in the carbon catalyst may be detected, for example, by an inductively-coupled plasma (ICP) emission spectrophotometric method.

The carbon catalyst exhibits a weight reduction rate at 200° C. to 1,200° C. of 12.0 wt % or less measured by thermogravimetric analysis (hereinafter referred to as "TG") in a nitrogen atmosphere. The carbon catalyst exhibits a weight reduction rate measured by TG of preferably 11.0 wt % or less, more preferably 10.0 wt % or less, still more preferably 9.0 wt % or less, particularly preferably 8.0 wt % or less.

The fact that the carbon catalyst exhibits a weight reduction rate equal to or less than the above-mentioned particular threshold value contributes to excellent durability of the carbon catalyst. Specifically, a smaller weight reduction rate of the carbon catalyst measured by TG in a nitrogen atmosphere indicates that the carbon catalyst is more thermally stable. For example, it is considered that the fact that the carbon catalyst is thermally stable is attributed to large binding energy between atoms forming the carbon structure of the carbon catalyst. Therefore, the carbon catalyst that is thermally stable is also electrochemically stable. The carbon catalyst that is electrochemically stable has high durability in applications such as a fuel cell. Thus, the carbon catalyst having a small weight reduction rate, which is measured by TG in a nitrogen atmosphere, exhibits excellent durability. There is no particular limitation on a lower limit value of the weight reduction rate of the carbon catalyst. The weight reduction rate may be 1.0 wt % or more.

Further, the carbon structure of the carbon catalyst exhibits, in the XAFS analysis of a K absorption edge of iron, (a) a 7,130/7,110 ratio of 7.0 or more, (b) a 7,135/7,110 ratio of 7.0 or more, or (a) a 7,130/7,110 ratio of 7.0 or more and (b) a 7,135/7,110 ratio of 7.0 or more. The above-mentioned 7,130/7,110 ratio and/or the above-mentioned 7,135/7,110 ratio of the carbon structure of the carbon catalyst is preferably 8.0 or more, more preferably 9.0 or more, still more preferably 10.0 or more, particularly preferably 11.0 or more. There is no particular limitation on upper limit values of the 7,130/7,110 ratio and the 7,135/7,110 ratio of the carbon catalyst. The 7,130/7,110 ratio and the 7,135/7,110 ratio may each be 30.0 or less.

The fact that the carbon structure of the carbon catalyst exhibits a 7, 130/7, 110 ratio equal to or more than the above-mentioned particular threshold value and/or a 7,135/7,110 ratio equal to or more than the above-mentioned particular threshold value in the XAFS analysis contributes to excellent catalytic activity of the carbon catalyst. Specifically, in the XAFS analysis of a K absorption edge of iron, the energy of a peak after the K absorption edge indicates energy for transition of an electron in a is orbital of an iron atom to an antibonding orbital of a σ bond and the energy reflects the binding energy of the σ bond. On the other hand, a peak before the K absorption edge indicates that the electron of the is orbital of the iron atom transitions to a d orbital, which indicates that the iron atom has an asymmetric structure.

Thus, the fact that the normalized absorbances at 7,130 eV and 7,135 eV are high indicates that the iron atom has two kinds of particular bonds exhibiting energy corresponding to 7,130 eV and 7,135 eV, and the fact that the normalized absorbance at 7,110 eV is high indicates that the iron atom has an asymmetric structure. In the carbon catalyst, it is considered that the iron atom having the two kinds of particular non-metal bonds functions as one of active points. Thus, the carbon catalyst having the carbon structure that exhibits a 7,130/7,110 ratio and/or a 7,135/7,110 ratio equal to or more than the above-mentioned particular threshold values in the XAFS analysis of the K absorption edge of iron has excellent catalytic activity as it contains a relatively large amount of the iron atoms having the two kinds of particular non-metal bonds.

In addition, when the carbon structure of the carbon catalyst exhibits a 7,130/7,110 ratio and/or a 7,135/7,110 ratio each falling within a range that is equal to or more than the above-mentioned particular threshold value and 30.0 or less in the XAFS analysis of iron, the two kinds of particular non-metal bonds and the asymmetric structure of the iron atom exist with a particular balance corresponding to the above-mentioned range in the carbon catalyst. In this case, the carbon catalyst has excellent catalytic activity as it contains the iron atoms having the two kinds of particular non-metal bonds and the asymmetric structure.

The carbon catalyst has excellent catalytic activity and excellent durability by containing iron, exhibiting a weight reduction rate equal to or less than the above-mentioned particular threshold value, and having the carbon structure that exhibits a 7,130/7,110 ratio and/or a 7,135/7,110 ratio equal to or more than the above-mentioned particular threshold values.

The carbon catalyst may be specified by appropriately combining: each of the above-mentioned threshold values for the weight reduction rate; and each of the above-mentioned threshold values for the 7,130/7,110 ratio and/or the 7,135/7,110 ratio.

Specifically, for example, the carbon catalyst preferably has a carbon structure exhibiting a 7,130/7,110 ratio of 8.0 or more and/or a 7,135/7,110 ratio of 8.0 or more and exhibits a weight reduction rate of 11.0 wt % or less, more preferably has a carbon structure exhibiting a 7,130/7,110 ratio of 9.0 or more and/or a 7,135/7,110 ratio of 9.0 or more and exhibits a weight reduction rate of 10.0 wt % or less, still more preferably has a carbon structure exhibiting a 7,130/7,110 ratio of 10.0 or more and/or a 7,135/7,110 ratio of 10.0 or more and exhibits a weight reduction rate of 9.0 wt % or less, and particularly preferably has a carbon structure exhibiting a 7,130/7,110 ratio of 11.0 or more and/or a 7,135/7,110 ratio of 11.0 or more and exhibits a weight reduction rate of 8.0 wt % or less.

The carbon catalyst may have a ratio of a mesopore volume to a total pore volume (hereinafter referred to as "mesopore ratio") of 20% or more. In this case, the mesopore ratio of the carbon catalyst is preferably 25% or more, particularly preferably 30% or more. There is no particular limitation on an upper limit value of the mesopore ratio of the carbon catalyst. The mesopore ratio may be, for example, 70% or less, preferably 65% or less.

The mesopore ratio of the carbon catalyst may be specified by appropriately combining: each of the above-mentioned lower limit values; and each of the above-mentioned upper limit values. That is, the mesopore ratio of the carbon catalyst is, for example, preferably 20% or more and 70% or less, more preferably 25% or more and 65% or less, particularly preferably 30% or more and 65% or less.

In this embodiment, a mesopore refers to a fine pore having a diameter of 2 nm or more and 50 nm or less, and a mesopore volume ($cm^3/g$) refers to a total volume of mesopores. A micropore refers to a fine pore having a diameter of less than 2 nm, and a micropore volume ($cm^3/g$) refers to a total volume of micropores. A macropore refers to a fine pore having a diameter of more than 50 nm, and a macropore volume ($cm^3/g$) refers to a total volume of macropores. A total pore volume ($cm^3/g$) refers to a total of the micropore volume, the mesopore volume, and the macropore volume.

The carbon catalyst may have a content of iron of 0.01 wt % or more measured by inductively-coupled plasma mass spectrometry (hereinafter referred to as "ICP-MS"). In this case, the content of iron of the carbon catalyst is particularly preferably 0.05 wt % or more.

The content of iron measured by the ICP-MS of the carbon catalyst is calculated as a ratio (wt %) of the weight of the iron atom to the total weight of the carbon catalyst. There is no particular limitation on an upper limit value of the content of iron of the carbon catalyst. The content of iron may be 10.00 wt % or less.

The carbon catalyst may exhibit a nitrogen atom content of 1.0 wt % or more measured by elemental analysis based on a combustion method. In this case, the carbon catalyst exhibits a nitrogen atom content measured by elemental analysis of preferably 1.1 wt % or more, particularly preferably 1.2 wt % or more.

The fact that the carbon catalyst exhibits a nitrogen atom content measured by elemental analysis equal to or more than the above-mentioned particular threshold value indicates that the carbon catalyst contains a relatively large amount of nitrogen atoms. There is no particular limitation on an upper limit value of the nitrogen atom content measured by elemental analysis of the carbon catalyst. The nitrogen atom content measured by elemental analysis may be 10.0 wt % or less.

The carbon catalyst may exhibit a nitrogen atom concentration of 1.0 atm % or more measured by X-ray photoelectron spectroscopy (hereinafter referred to as "XPS") and exhibit a nitrogen atom content of 1.0 wt % or more measured by elemental analysis based on a combustion method.

In this case, the carbon catalyst preferably exhibits a nitrogen atom concentration measured by XPS of 1.1 atm % or more and a nitrogen atom content measured by elemental analysis of 1.1 wt % or more, particularly preferably a nitrogen atom concentration measured by XPS of 1.2 atm % or more and a nitrogen atom content measured by elemental analysis of 1.2 wt % or more.

The fact that the carbon catalyst exhibits a nitrogen atom concentration measured by XPS equal to or more than the above-mentioned particular threshold value and a nitrogen atom content measured by elemental analysis equal to or more than the above-mentioned particular threshold value reflects that the carbon catalyst contains nitrogen atoms not only in a surface layer portion thereof (portion having a depth of several nm from the surface) but also in an inner portion thereof (inner portion deeper than the surface layer portion) in an amount equal to that of the surface layer portion, specifically, the carbon catalyst has a relatively homogeneous carbon structure from the surface layer portion to the inner portion.

Ina case where the carbon catalyst has a relatively homogeneous carbon structure from the surface layer portion to the inner portion as described above, for example, even when an active point in the surface layer portion is lost, a decrease in catalytic activity of the carbon catalyst is effectively suppressed through the function of an active point in the inner portion deeper than the surface layer portion.

There is no particular limitation on upper limit values of the nitrogen atom concentration measured by XPS of the carbon catalyst and the nitrogen atom content measured by elemental analysis of the carbon catalyst. The nitrogen atom concentration measured by XPS may be 10.0 atm % or less, and the nitrogen atom content measured by elemental analysis may be 10.0 wt % or less.

The carbon catalyst may exhibit a ratio of a nitrogen atom content to a carbon atom content, which is measured by elemental analysis based on a combustion method (hereinafter referred to as "N/C ratio measured by elemental analysis"), of 1.1% or more. In this case, the carbon catalyst exhibits a N/C ratio measured by elemental analysis of preferably 1.2% or more, more preferably 1.3% or more, still more preferably 1.4% or more, particularly preferably 1.5% or more.

The fact that the carbon catalyst exhibits a N/C ratio measured by elemental analysis equal to or more than the above-mentioned particular threshold value indicates that the carbon catalyst contains a relatively large amount of nitrogen atoms. There is no particular limitation on an upper limit value of the N/C ratio measured by elemental analysis of the carbon catalyst. The N/C ratio measured by elemental analysis of the carbon catalyst may be 15.0% or less.

The carbon catalyst may exhibit a ratio of a nitrogen atom concentration to a carbon atom concentration, which is measured by XPS (hereinafter referred to as "N/C ratio measured by XPS"), of 1.1% or more and exhibit a N/C ratio of 1.1% or more measured by elemental analysis based on a combustion method.

In this case, the carbon catalyst exhibits preferably a N/C ratio measured by XPS of 1.2% or more and a N/C ratio measured by elemental analysis of 1.2% or more, more preferably a N/C ratio measured by XPS of 1.3% or more and a N/C ratio measured by elemental analysis of 1.3% or more, still more preferably a N/C ratio measured by XPS of 1.4% or more and a N/C ratio measured by elemental analysis of 1.4% or more, particularly preferably a N/C ratio measured by XPS of 1.5% or more and a N/C ratio measured by elemental analysis of 1.5% or more.

The fact that the carbon catalyst exhibits a N/C ratio measured by XPS equal to or more than the above-mentioned particular threshold value and a N/C ratio measured by elemental analysis equal to or more than the above-mentioned particular threshold value reflects that the carbon catalyst contains nitrogen atoms not only in a surface layer portion thereof (portion having a depth of several nm from the surface) but also in an inner portion thereof (inner portion deeper than the surface layer portion) in an amount equal to that of the surface layer portion.

In a case where the carbon catalyst has a relatively homogeneous carbon structure from the surface layer portion to the inner portion as described above, for example, even when an active point in the surface layer portion is lost, a decrease in catalytic activity of the carbon catalyst is effectively suppressed through the function of an active point in the inner portion deeper than the surface layer portion.

There is no particular limitation on upper limit values of the N/C ratio measured by XPS of the carbon catalyst and the N/C ratio measured by elemental analysis of the carbon catalyst. The N/C ratio measured by XPS may be 15.0% or less, and the N/C ratio measured by elemental analysis may be 15.0% or less.

The carbon catalyst may contain iron and a metal other than iron (hereinafter referred to as "non-ferrous metal"). In this case, there is no particular limitation on the non-ferrous metal contained in the carbon catalyst as long as the above-mentioned characteristics of the carbon catalyst are obtained. It is preferred that the non-ferrous metal be a transition metal.

In this embodiment, the non-ferrous metal is a metal belonging to Groups III to XII in the periodic table, preferably a transition metal belonging to the fourth period of Groups III to XII in the periodic table. Specifically, the non-ferrous metal contained in the carbon catalyst may be, for example, one or more kinds selected from the group consisting of scandium (Sc), titanium (Ti), vanadium (V), chromium (Cr), manganese (Mn), cobalt (co), nickel (Ni), copper (Cu), zinc (Zn), yttrium (Y), zirconium (Zr), niobium (Nb), molybdenum (Mo), ruthenium (Ru), rhodium (Rh), palladium (Pd), silver (Ag), lanthanoids (e.g., one or more kinds selected from the group consisting of neodymium (Nd), samarium (Sm), and gadolinium (Gd)), and actinoids, or the group consisting of Sc, Ti, V, Cr, Mn, Co, Ni, Cu, Zn, Y, Zr, Nb, Mo, Ag, lanthanoids (e.g., one or more kinds selected from the group consisting of Nd, Sm, and Gd), and actinoids.

The carbon catalyst preferably contains Fe and one or more kinds of non-ferrous metals selected from the group consisting of Ti, Cr, Zn, Nd, Sm, and Gd, more preferably Fe and one or more kinds of non-ferrous metals selected from the group consisting of Cr, Zn, and Gd. In this case, the carbon catalyst may contain, for example, Fe and Zn.

When the carbon catalyst contains the above-mentioned particular transition metal as the non-ferrous metal, the carbon catalyst may further contain another transition metal. That is, for example, when the carbon catalyst contains Fe and one or more kinds of first non-ferrous transition metals selected from the group consisting of Ti, Cr, Zn, Nd, Sm, and Gd, the carbon catalyst may further contain one or more kinds of second non-ferrous transition metals selected from the group consisting of Sc, Ti, V, Cr, Mn, Co, Ni, Cu, Y, Zr, Nb, Mo, Ru, Rh, Pd, Ag, lanthanoids (e.g., one or more kinds selected from the group consisting of Nd, Sm, and Gd), and actinoids, or the group consisting of Sc, Ti, V, Cr, Mn, Co, Ni, Cu, Zn, Y, Zr, Nb, Mo, Ag, lanthanoids (e.g., one or more kinds selected from the group consisting of Nd, Sm, and Gd), and actinoids, which are different from the first non-ferrous transition metals.

The carbon catalyst may be free of platinum (Pt). In this case, the carbon catalyst may be free of one or more kinds selected from the group consisting of platinum (Pt), ruthenium (Ru), rhodium (Rh), palladium (Pd), iridium (Ir), gold (Au), and osmium (Os).

When the carbon catalyst contains a non-ferrous metal derived from a raw material for carbonization, described later, in addition to iron, the carbon catalyst contains the iron and the non-ferrous metal therein, which have been contained in the raw material for carbonization. Specifically, even when the carbon catalyst is produced through metal removal treatment described later, trace amounts of the iron and the non-ferrous metal remain in the carbon catalyst.

Specifically, for example, in a case where the carbon catalyst containing iron and the non-ferrous metal has a particle shape, when the particle forming the carbon catalyst is cut, the iron and the non-ferrous metal are detected on a cross section of the particle exposed by cutting. The iron and the non-ferrous metal contained in the carbon catalyst may be detected, for example, by an inductively-coupled plasma (ICP) emission spectrophotometric method.

The carbon catalyst may have a specific surface area of 800 $m^2/g$ or more measured by a BET method. In this case, the specific surface area of the carbon catalyst measured by a BET method using nitrogen gas is preferably 1,000 $m^2/g$ or more, particularly preferably 1,200 $m^2/g$ or more.

The fact that the specific surface area of the carbon catalyst is equal to or more than the above-mentioned particular threshold value contributes to streamlining of a chemical reaction by the carbon catalyst, and to excellent catalytic activity. There is no particular limitation on an upper limit value of the specific surface area of the carbon catalyst. The specific surface area may be 3,000 $m^2/g$ or less.

The carbon catalyst is formed of a carbon material having catalytic activity (e.g., oxygen reduction activity) by itself. The carbon material is a carbonized material obtained by carbonizing a raw material containing an organic substance and iron. That is, the carbon catalyst is a carbonized material of the raw material containing an organic substance and iron. In addition, when the carbon catalyst is formed of a carbonized material obtained by carbonizing a raw material containing an organic substance, iron, and a non-ferrous metal, the non-ferrous metal is contained in the carbon structure of the carbon catalyst. In this case, it is considered that the catalytic activity of the carbon catalyst is mainly ascribed to an active point contained in the iron and the carbon structure itself rather than the non-ferrous metal.

The carbon catalyst may be substantially free of an organic compound. That is, the content of the organic compound in the carbon catalyst may be, for example, 5 wt % or less or 1 wt % or less.

When the CC layer 11 contains the above-mentioned particular carbon catalyst, the Pt layer 12 may be free of the particular carbon catalyst. In this case, the Pt layer 12 may contain a carbon catalyst other than the particular carbon catalyst.

When the CC layer 11 contains the particular carbon catalyst, the cathode 10 need not include a layer containing the particular carbon catalyst. In this case, the cathode 10 may include a layer containing a carbon catalyst other than the particular carbon catalyst.

There is no particular limitation on a production method for the carbon catalyst as long as the carbon catalyst having the above-mentioned characteristics is obtained. In this embodiment, a method including carbonizing a raw material containing an organic substance and iron under pressurization is described.

There is no particular limitation on the organic substance contained in the raw material as long as the organic substance can be carbonized. Specifically, as the organic substance, for example, high-molecular-weight organic compounds (e.g., resins such as a thermosetting resin and/or a thermoplastic resin), and/or low-molecular-weight organic compounds are used. In addition, a biomass may be used as the organic substance.

As the organic substance, a nitrogen-containing organic substance is preferably used. There is no particular limitation on the nitrogen-containing organic substance as long as the nitrogen-containing organic substance is an organic substance containing an organic compound that contains a nitrogen atom in a molecule thereof. When the carbon catalyst is a carbonized product of a raw material containing the nitrogen-containing organic substance, the carbon structure of the carbon catalyst contains a nitrogen atom.

Specifically, for example, one or more kinds selected from the group consisting of polyacrylonitrile, a polyacrylonitrile-polyacrylic acid copolymer, a polyacrylonitrile-polymethyl acrylate copolymer, a polyacrylonitrile-polymethacrylic acid copolymer, a polyacrylonitrile-polymethacrylic acid-polymethallylsulfonic acid copolymer, a polyacrylonitrile-polymethyl methacrylate copolymer, a phenol resin, polyfurfuryl alcohol, furan, a furan resin, a phenol formaldehyde resin, melamine, a melamine resin, an epoxy resin, a nitrogen-containing chelate resin (e.g., one or more kinds selected from the group consisting of polyamine-type, iminodiacetic acid-type, aminophosphoric acid-type, and aminomethylphosphonic acid-type resins), a polyamideimide resin, pyrrole, polypyrrole, polyvinylpyrrole, 3-methylpolypyrrole, acrylonitrile, polyvinylidene chloride, thiophene, oxazole, thiazole, pyrazole, vinylpyridine, polyvinylpyridine, pyridazine, pyrimidine, piperazine, pyran, morpholine, imidazole, 1-methylimidazole, 2-methylimidazole, quinoxaline, aniline, polyaniline, succinic acid dihydrazide, adipic acid dihydrazide, polysulfone, polyaminobismaleimide, polyimide, polyvinyl alcohol, polyvinyl butyral, benzimidazole, polybenzimidazole, polyamide, polyester, polylactic acid, polyether, polyether ether ketone, cellulose, carboxymethyl cellulose, lignin, chitin, chitosan, pitch, lignite, silk, wool, polyamino acid, a nucleic acid, DNA, RNA, hydrazine, hydrazide, urea, salen, polycarbazole, polybismaleimide, triazine, polyacrylic acid, polyacrylic acid ester, polymethacrylic acid ester, polymethacrylic acid, polyurethane, polyamide amine, and polycarbodiimide are used as the organic substance.

There is no particular limitation on the content of the organic substance in the raw material as long as the content falls within a range in which the carbon catalyst is obtained. The content of the organic substance in the raw material may be, for example, 5 mass % or more and 90 mass % or less, preferably 10 mass % or more and 80 mass % or less.

As iron to be contained in the raw material for carbonization, a simple substance of the iron and/or a compound of the iron is used. As the iron compound, for example, one or more kinds selected from the group consisting of a salt of iron, an oxide of iron, a hydroxide of iron, a nitride of iron, a sulfide of iron, a carbide of iron, and a complex of iron may be used.

There is no particular limitation on the content of iron in the raw material as long as the content falls within a range in which the carbon catalyst is obtained. The content of iron may be, for example, 0.001 mass % or more and 90 mass % or less, preferably 0.002 mass % or more and 80 mass % or less.

The raw material for carbonization may further contain a non-ferrous metal. In this case, the raw material containing an organic substance, iron, and a non-ferrous metal is carbonized under pressure. When the carbon catalyst is a carbonized material obtained by carbonizing the raw material containing an organic substance, iron, and a non-ferrous metal, the carbon catalyst contains the iron and the non-ferrous metal. There is no particular limitation on the non-ferrous metal contained in the raw material as long as the characteristics of the carbon catalyst described above are obtained. It is preferred that the non-ferrous metal be a transition metal.

In this embodiment, the non-ferrous metal is a metal belonging to Groups III to XII in the periodic table, preferably a transition metal belonging to the fourth period of Groups III to XII in the periodic table. Specifically, the non-ferrous metal contained in the raw material may be, for example, one or more kinds selected from the group consisting of Sc, Ti, V, Cr, Mn, Co, Ni, Cu, Zn, Y, Zr, Nb, Mo, Ru, Rh, Pd, Ag, lanthanoids (e.g., one or more kinds selected from the group consisting of Nd, Sm, and Gd), and actinoids, or the group consisting of Sc, Ti, V, Cr, Mn, Co, Ni, Cu, Zn, Y, Zr, Nb, Mo, Ag, lanthanoids (e.g., one or more kinds selected from the group consisting of Nd, Sm, and Gd), and actinoids.

In addition, the raw material preferably contains Fe and one or more kinds of non-ferrous metals selected from the group consisting of Ti, Cr, Zn, Nd, Sm, and Gd, more preferably Fe and one or more kinds of non-ferrous metal s selected from the group consisting of Cr, Zn, and Gd. In this case, the raw material may contain Fe and Zn.

When the raw material contains the above-mentioned particular transition metal as a non-ferrous metal in addition to iron, the raw material may further contain another transition metal. That is, for example, when the raw material contains Fe and one or more kinds of first non-ferrous transition metals selected from the group consisting of Ti, Cr, Zn, Nd, Sm, and Gd, the raw material may further contain one or more kinds of second non-ferrous transition metals selected from the group consisting of Sc, Ti, V, Cr, Mn, Co, Ni, Cu, Zn, Y, Zr, Nb, Mo, Ru, Rh, Pd, Ag, lanthanoids (e.g., one or more kinds selected from the group consisting of Nd, Sm, and Gd), and actinoids, or the group consisting of Sc, Ti, V, Cr, Mn, Co, Ni, Cu, Zn, Y, Zr, Nb, Mo, Ag, lanthanoids (e.g., one or more kinds selected from the group consisting of Nd, Sm, and Gd), and actinoids, which are different from the first non-ferrous transition metals. In addition, the raw material may be free of platinum (Pt).

In this case, the raw material may be free of one or more kinds selected from the group consisting of platinum (Pt), ruthenium (Ru), rhodium (Rh), palladium (Pd), iridium (Ir), gold (Au), and osmium (Os).

As the non-ferrous metal contained in the raw material, a simple substance of the non-ferrous metal and/or a compound of the non-ferrous metal is used. As the non-ferrous metal compound, for example, one or more kinds selected from the group consisting of a salt of a non-ferrous metal, an oxide of a non-ferrous metal, a hydroxide of a non-ferrous metal, a nitride of anon-ferrous metal, a sulfide of a non-ferrous metal, a carbide of a non-ferrous metal, and a complex of a non-ferrous metal may be used.

There is no particular limitation on the content of the non-ferrous metal in the raw material (total content of two or more kinds of non-ferrous metals when the two or more kinds of non-ferrous metals are used) as long as the content falls within a range in which the carbon catalyst is obtained.

The content of the non-ferrous metal in the raw material may be, for example, 1 mass % or more and 90 mass % or less, preferably 2 mass % or more and 80 mass % or less.

Carbonization is performed by heating the raw material and keeping the raw material at a temperature at which the raw material is carbonized (hereinafter referred to as "carbonizing temperature") under pressurization. There is no particular limitation on the carbonizing temperature as long as the raw material is carbonized. The carbonizing temperature is, for example, 300° C. or more. Specifically, in this case, the raw material containing an organic substance is carbonized at a temperature of 300° C. or more under pressurization.

In addition, the carbonizing temperature may be, for example, 700° C. or more, preferably 900° C. or more, more preferably 1,000° C. or more, particularly preferably 1,100° C. or more. There is no particular limitation on an upper limit value of the carbonizing temperature. The carbonizing temperature is, for example, 3,000° C. or less.

A temperature increase rate up to the carbonizing temperature is, for example, 0.5° C./min or more and 300° C./min or less. The period of time for keeping the raw material at the carbonizing temperature is, for example, 1 second or more and 24 hours or less, preferably 5 minutes or more and 24 hours or less. It is preferred that the carbonization be performed in an inert gas atmosphere, such as a nitrogen atmosphere. Specifically, for example, it is preferred that the carbonization be performed under the flow of inert gas, such as nitrogen gas.

There is no particular limitation on the pressure of the atmosphere in which the carbonization is performed as long as the pressure is higher than an atmospheric pressure. The pressure of the atmosphere for the carbonization is, for example, a pressure of 0.05 MPa or more in terms of a gauge pressure. Specifically, in this case, the raw material containing an organic substance is carbonized under a pressure of 0.05 MPa or more in terms of a gauge pressure.

Further, the pressure of the atmosphere in which the carbonization is performed in terms of a gauge pressure may be 0.10 MPa or more, 0.15 MPa or more, or 0.20 MPa or more.

The production method for the carbon catalyst may further include subjecting a carbonized material obtained by the above-mentioned carbonization to further treatment. Specifically, for example, the carbonized material may be subjected to metal removal treatment. In this case, the production method for the carbon catalyst includes carbonizing the raw material containing an organic substance under pressurization, and then subjecting the carbonized material obtained by the carbonization to metal removal treatment. The metal removal treatment is treatment including reducing the amount of the metal derived from the raw material contained in the carbonized material. The metal removal treatment is, for example, washing treatment using an acid and/or electrolytic treatment.

Next, specific Examples according to this embodiment will be described.

EXAMPLES

Catalyst Preparation Example 1

1.0 g of polyacrylonitrile (PAN), 1.0 g of 2-methylimidazole, 6.0 g of zinc chloride ($ZnCl_2$), 0.18 g of iron(III) chloride hexahydrate ($FeCl_3 \cdot 6H_2O$), and 30 g of dimethylformamide were mixed. The solvent was removed from the obtained mixture by drying. The dried mixture was heated in the atmosphere to be infusibilized at 250° C. The infusibilized mixture was heated and kept at 1,300° C. under a gauge pressure of 0.90 MPa in a nitrogen atmosphere to be carbonized.

Dilute hydrochloric acid was added to the carbonized material obtained by the carbonization, followed by stirring. After that, the suspension containing the carbonized material was filtered through use of a membrane filter, and the carbonized material was washed with distilled water until the filtrate became neutral. Thus, metal removal treatment through washing using an acid was performed.

The carbonized material after the metal removal treatment was pulverized with a pulverizer until the median value of the particle diameters thereof became 1 μm or less. Thus, the pulverized carbonized material was obtained as a carbon catalyst of Catalyst Preparation Example 1.

Catalyst Preparation Example 2

A carbon catalyst of Catalyst Preparation Example 2 was obtained in the same manner as in Catalyst Preparation Example 1 except that the carbonization was performed under a gauge pressure of 0.20 MPa instead of 0.90 MPa.

Catalyst Preparation Example 3

A carbon catalyst of Catalyst Preparation Example 3 was obtained in the same manner as in Catalyst Preparation Example 1 except that a mixture further containing 0.018 g of chromium chloride hexahydrate ($CrCl_3 \cdot 6H_2O$) was prepared before the infusibilization, and the mixture was infusibilized.

Catalyst Preparation Example 4

A carbon catalyst of Catalyst Preparation Example 4 was obtained in the same manner as in Catalyst Preparation Example 1 except that a mixture further containing 0.06 g of boric acid ($B(HO)_3$) was prepared before the infusibilization, and the mixture was infusibilized.

Catalyst Preparation Example 5

A carbon catalyst of Catalyst Preparation Example 5 was obtained in the same manner as in Catalyst Preparation Example 1 except that 2.0 g of 2-methylimidazole was used instead of 1.0 g of 2-methylimidazole.

Catalyst Preparation Example 6

A carbon catalyst of Catalyst Preparation Example 6 was obtained in the same manner as in Catalyst Preparation Example 1 except that a mixture further containing 0.075 g of gadolinium nitrate hexahydrate ($Gd(NO_3)_3 \cdot 6H_2O$) was prepared before the infusibilization, and the mixture was infusibilized.

Comparative Preparation Example 1

1.0 g of polyacrylonitrile (PAN), 1.0 g of 2-methylimidazole, 6.0 g of zinc chloride ($ZnCl_2$), 0.18 g of iron(III) chloride hexahydrate ($FeCl_3 \cdot 6H_2O$), and 30 g of dimethylformamide were mixed. The solvent was removed from the obtained mixture by drying. The dried mixture was heated in the atmosphere to be infusibilized at 250° C. The infusibilized mixture was heated and kept at 1,300° C. under ordinary pressure in a nitrogen atmosphere to be carbonized.

Dilute hydrochloric acid was added to the carbonized material obtained by the carbonization, followed by stirring. After that, the suspension containing the carbonized material was filtered through use of a membrane filter, and the carbonized material was washed with distilled water until the filtrate became neutral. Thus, metal removal treatment through washing using an acid was performed.

The carbonized material after the metal removal treatment was pulverized with a pulverizer until the median value of the particle diameters thereof became 1 μm or less. Thus, the pulverized carbonized material was obtained as a carbon catalyst of Comparative Preparation Example 1.

Comparative Preparation Example 2

A carbon catalyst of Comparative Preparation Example 2 was obtained in the same manner as in Comparative Preparation Example 1 except that the carbonization was performed at 1,000° C. instead of 1,300° C.

Comparative Preparation Example 3

A carbon catalyst of Comparative Preparation Example 3 was obtained in the same manner as in Comparative Preparation Example 1 except that the carbonization was performed at 800° C. instead of 1,300° C.

Comparative Preparation Example 4

Under a nitrogen stream, 56.35 parts by mass of acrylonitrile was added to a flask containing 280 mL of toluene and dissolved therein, and then, 0.75 part by mass of 2,2'-azobisisobutyronitrile was added thereto. The contents were increased in temperature to 60° C. while being stirred, and caused to react with each other for 3.5 hours. After the generation of a white precipitate was confirmed, the reaction was finished. Tetrahydrofuran was added to the reaction product, followed by filtration. The filtered product was washed with tetrahydrofuran, and filtered and dried to obtain polyacrylonitrile particles.

The obtained polyacrylonitrile particles were gradually increased in temperature from 190° C. and subjected to heat treatment at 230° C. for 1 hour in air, to thereby obtain an infusibilized body of the polyacrylonitrile particles. Iron(II) chloride tetrahydrate was supported on the obtained infusibilized body so as to give a composition containing 0.3 mass % of an iron atom. The obtained composition including the polyacrylonitrile infusibilized body and the iron(II) chloride tetrahydrate was subjected to heat treatment at 600° C. for 5 hours under a nitrogen stream, and then subjected to dispersion treatment with a ball mill. Next, the resultant was subjected to heat treatment (activation treatment) at 800° C. for 1 hour and at 1,000° C. for 1 hour, each time under an ammonia stream, to thereby obtain a carbon catalyst having a particle shape (carbon catalyst of Comparative Preparation Example 4).

[Thermogravimetric Analysis]

The weight reduction rate of the carbon catalyst was measured by TG in a nitrogen atmosphere through use of a differential thermal balance (TG-DTA2020SA, manufactured by Bruker AXS Inc.). Specifically, an alumina container containing 10 mg of the carbon catalyst was set in the device, and the device was then kept for 1 hour in a state in which nitrogen (200 mL/min) flowed therein at normal temperature. After that, the carbon catalyst was heated from normal temperature to 1,200° C. at a temperature increase rate of 10° C./min, and a weight reduction rate at 200° C. to 1,200° C. was measured. In order to remove the influence of water and the like adsorbing to the carbon catalyst, a value obtained by dividing a difference, which was obtained by subtracting the weight of the carbon catalyst at 1,200° C. from the weight of the carbon catalyst at 200° C., by the weight of the carbon catalyst at 200° C. was multiplied by 100, to thereby obtain a weight reduction rate (wt %) of the carbon catalyst.

Figure 2:
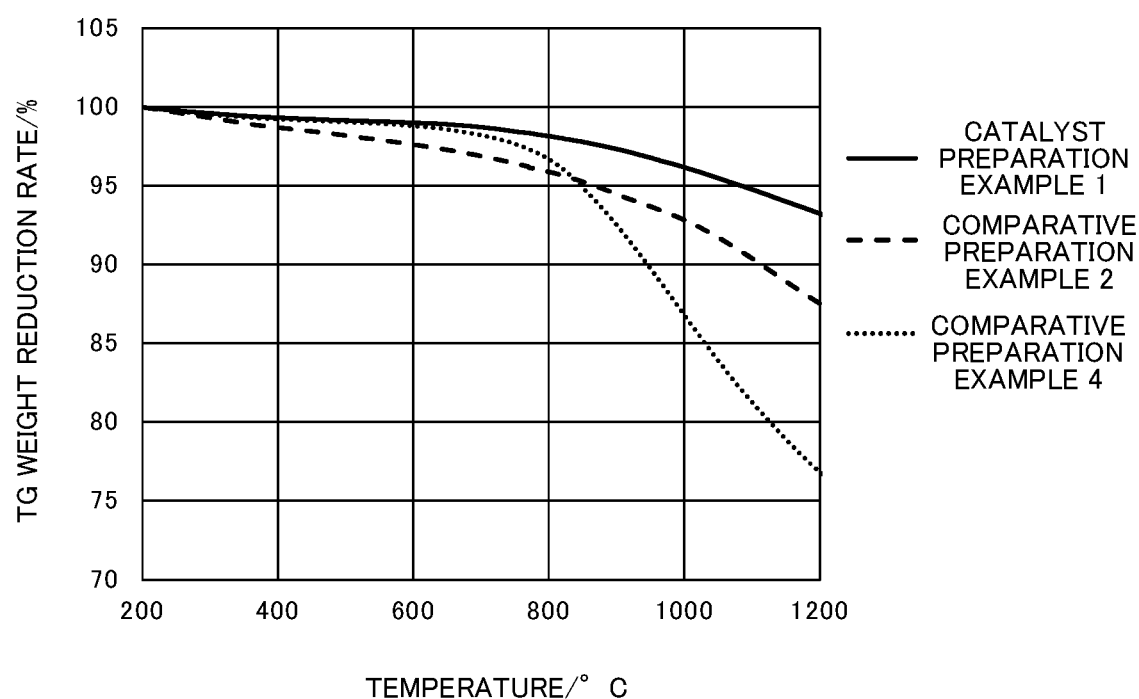
FIG. 2 an explanatory diagram for showing an example of results obtained by measuring weight reduction rates of carbon catalysts by thermogravimetric analysis in Examples according to one embodiment of the present invention.

In FIG. 2, there are shown measurement results of weight reduction rates measured by TG of the carbon catalysts obtained in Catalyst Preparation Example 1 and Comparative Preparation Examples 2 and 4. In FIG. 2, the horizontal axis represents a temperature (° C.), and the vertical axis represents a weight reduction rate (%) measured by TG.

[X-Ray Absorption Fine Structure Analysis]

The XAFS analysis of a K absorption edge of iron contained in the carbon catalyst was performed. Specifically, the XAFS analysis using a hard X-ray was performed through use of a beam line BL5S1 of Aichi Synchrotron Light Center (Aichi Prefecture, Japan) (Ring: 1.2 GeV/300.0 mA to 300.3 mA, monochromator: Si(111), beam size: 0.50 mm×0.30 mm, number of photons: $10^{10}$ at 7,000 eV, resolution (E/AE): 7,000 at 12 keV).

Specifically, the carbon catalyst, in which the amount thereof was adjusted so that an edge jump (difference in absorbance before and after an absorption edge) became 1, was packed in a cylinder and compressed. A sample thus produced was measured by a transmission method. However, in the case where the absorbance after the absorption edge (energy for exciting electrons bound to the orbital of an atom to the lowest unoccupied state (absorption edge energy)) exceeded 4 when the edge jump was 1, the amount of the carbon catalyst was adjusted so that the edge jump was maximized within a range in which the absorbance after the absorption edge did not exceed 4. In addition, when a bulk was small and was not suitable for measurement with the amount in which the edge jump became 1, a mixture obtained by adding boron nitride (BN) to the carbon catalyst was packed in the cylinder. The measurement range was from 6,813 eV to 8,213 eV, the step width was 0.32 eV, and the measurement time was 0.06 sec/point.

In the analysis, one kind of general XAFS analysis software "Athena" was used. (Athena Demeter 0.9.24, copyright 2006-2015 Bruce Ravel using Ifeffit 1.2.12 copyright 2008 Matt Newville, Univ of Chicago).

The normalization was performed by inputting the following numerical values in the column "Normalization and background removal parameters" in the "Main window" of the analysis software "Athena". $E_0$: energy when absorbance has maximum first-order differentiation. Normalization order: 3. Pre-edge range: −150 to −30. Normalization range: 150 to 1,000. Flatten normalized data: On. The conditions were not changed from default. There is no particular limitation on the normalization as long as backgrounds before and after the absorption edge were drawn so as to pass through the center of measurement data in each region.

Figure 3:
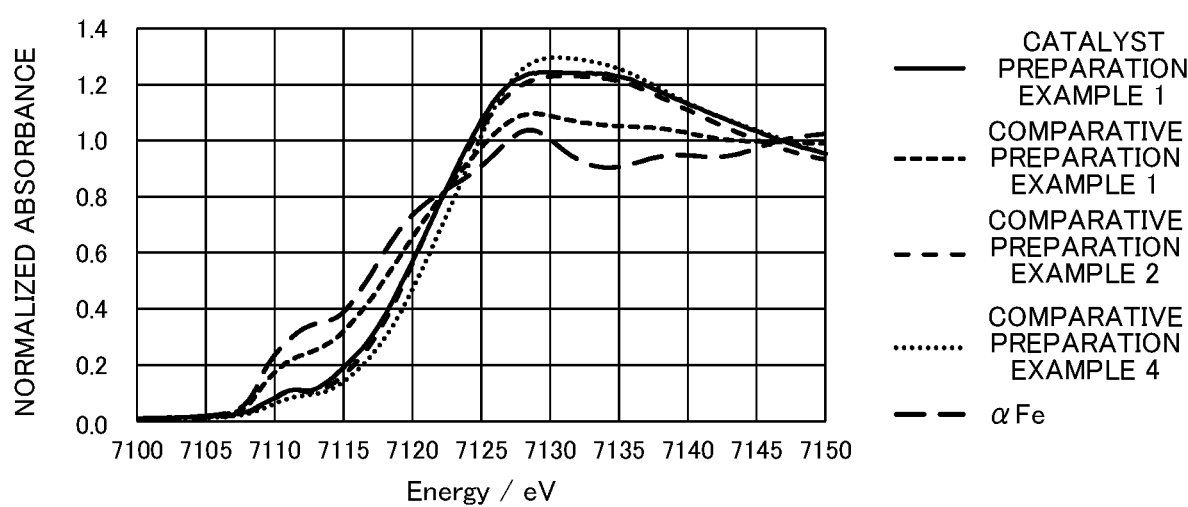
FIG. 3 is an explanatory diagram for showing an example of results obtained by performing X-ray absorption fine structure analysis of a K absorption edge of iron in Examples according to one embodiment of the present invention.

In FIG. 3, there are shown XAFS spectra of the carbon catalysts obtained in Catalyst Preparation Example 1 and Comparative Preparation Examples 1, 2, and 4, and an XAFS spectrum of powdery α-iron (iron powder manufactured by Wako Pure Chemical Industries, Ltd.) having an average particle diameter of 150 μm for comparison. In FIG. 3, the horizontal axis represents energy (eV), and the vertical axis represents a normalized absorbance.

[BET Specific Surface Area, Micropore Volume, Mesopore Volume, and Macropore Volume]

A specific surface area, a micropore volume, a mesopore volume, and a macropore volume of the carbon catalyst were measured through use of a specific surface area/pore distribution measurement device (Tristar 3000, manufactured by Shimadzu Corporation).

Specifically, first, 0.1 g of the carbon catalyst was kept at 100° C. and $6.7 \times 10^{-2}$ Pa for 3 hours, to thereby remove moisture adsorbing to the carbon catalyst. Then, a specific surface area ($m^2/g$) of the carbon catalyst was obtained from a nitrogen adsorption isotherm at 77 K by a BET method. The nitrogen adsorption isotherm at 77 K was obtained by measuring a change in nitrogen adsorption amount to the carbon material in association with a change in pressure of nitrogen gas at a temperature of 77 K.

Meanwhile, a macropore volume ($cm^3/g$) and a mesopore volume ($cm^3/g$) were obtained from the nitrogen adsorption isotherm at a temperature of 77 K by a BJH method. A total pore volume ($cm^3/g$) was obtained based on an adsorption amount at a point of $P/P_0=0.98$ of the nitrogen adsorption isotherm at a temperature of 77 K (P represents a pressure at a time of equilibrium, and $P_0$ represents a saturated vapor pressure ($1.01 \times 10^5$ Pa for nitrogen at 77 K)). Further, a total of the macropore volume and the mesopore volume was subtracted from the total pore volume to calculate a micropore volume ($cm^3/g$). A value obtained by dividing the mesopore volume ($cm^3/g$) by the total pore volume ($cm^3/g$) was multiplied by 100 to calculate a mesopore ratio (%).

The BJH method is a typical method of obtaining a distribution of mesopores proposed by Barrett, Joyner, and Halenda (E P Barrett, L G Joyner and P P Halenda, J Am Chem Soc, 73, 373, (1951)).

[Inductively-Coupled Plasma Mass Spectrometry]

A content of iron of the carbon catalyst was measured by the ICP-MS. Specifically, 25 mg of the carbon catalyst was heated and kept in an atmospheric atmosphere at 800° C. for 3 hours to remove a non-metal component in the carbon catalyst. After that, the carbon catalyst was immersed in 5 mL of concentrated hydrochloric acid to dissolve a metal contained in the carbon catalyst. Then, distilled water was added to the resultant so that the total weight became 25 g to dilute the resultant, to thereby obtain a metal solution. An iron atom concentration of the obtained metal solution was measured through use of a sequential plasma emission spectrometer (ICP-8100, manufactured by Shimadzu Corporation).

Then, a value obtained by dividing a value, which was obtained by multiplying the iron atom concentration (mg/g) of the metal solution by the weight (25 g) of the metal solution, by the weight (25 mg) of the carbon catalyst, was multiplied by 100, to thereby calculate a content of iron (wt %) of the carbon catalyst.

[X-Ray Photoelectron Spectroscopy]

The carbon catalyst was analyzed by XPS. Specifically, a photoelectron spectrum from each core level of a carbon atom, a nitrogen atom, and an oxygen atom on the surface of the carbon catalyst was measured through use of an X-ray photoelectron spectroscope (AXIS Nova, manufactured by Kratos). As an X-ray source, an AlKα line (10 mA, 15 kV, Pass energy: 40 eV) was used. In the obtained photoelectron spectrum, binding energy was corrected so that the peak top of the $C_{1s}$ peak derived from the is orbital of the carbon atom was located at 284.5 eV.

A nitrogen atom concentration (atm %), a carbon atom concentration (atm %), and an oxygen atom concentration (atm %) were obtained from the obtained photoelectron spectrum. In addition, a value obtained by dividing the nitrogen atom concentration (atm %) by the carbon atom concentration (atm %) was multiplied by 100 to calculate a N/C ratio (%) measured by XPS.

[Elemental Analysis]

The carbon catalyst was subjected to elemental analysis based on a combustion method. Specifically, a nitrogen content of the carbon catalyst was measured by a combustion method through use of an organic trace elemental analysis device (240011, manufactured by PerkinElmer Co., Ltd.). 2 mg of the carbon catalyst was analyzed through use of helium as carrier gas under the conditions of a combustion tube temperature of 980° C. and a reduction tube temperature of 640° C. A value obtained by dividing the weight of the nitrogen atoms contained in the carbon catalyst by the total weight of the carbon catalyst was multiplied by 100 to calculate a nitrogen atom content (wt %) of the carbon catalyst.

Similarly, values obtained by dividing the weights of the carbon atoms and the hydrogen contained in the carbon catalyst by the total weight of the carbon catalyst were multiplied by 100 to calculate a carbon atom content (wt %) and a hydrogen atom content (wt %), respectively. Further, a value obtained by dividing the nitrogen atom content (wt %) by the carbon atom content (wt %) was multiplied by 100 to calculate a N/C ratio (%) measured by elemental analysis.

[Catalytic Activity]

The carbon catalyst was evaluated for catalytic activity through use of a rotating ring disk electrode device (RRDE-3A rotating ring disk electrode device ver. 1.2, manufactured by BAS Inc.) and a dual electrochemical analyzer (CHI700C, manufactured by ALS Corporation). Specifically, first, a tripolar rotating ring disk electrode device including a working electrode containing the carbon catalyst was manufactured. Specifically, 5 mg of the carbon catalyst, 50 μL of 5% Nafion (trademark) (Nafion manufactured by Sigma-Aldrich, perfluorinated ion exchange resin, 5% solution (product number: 510211)), 400 μL of water, and 100 μL of isopropyl alcohol were mixed to prepare a slurry. Then, the slurry was subjected to ultrasonic treatment for 10 minutes, followed by homogenizer treatment for 2 minutes. The obtained slurry was applied onto a working electrode (ring disk electrode for RRDE-3A, platinum ring-gold disk electrode, disk diameter of 4 mm, manufactured by BAS Inc.) so that the application amount of the carbon catalyst became 0.1 mg/cm$^2$, followed by drying, to thereby manufacture a working electrode containing the carbon catalyst.

In addition, a platinum electrode (Pt counter electrode of 23 cm, manufactured by BAS Inc.) was used as a counter electrode, and a reversible hydrogen electrode (RHE) (storage type reversible hydrogen electrode manufactured by EC Frontier Co., Ltd.) was used as a reference electrode. Thus, a rotating ring disk electrode device including the working electrode containing the carbon catalyst, the platinum electrode serving as the counter electrode, and the reversible hydrogen electrode (RHE) serving as the reference electrode, was obtained. In addition, as an electrolytic solution, a 0.1 M perchloric acid aqueous solution was used.

The catalytic activity was measured through use of the above-mentioned rotating ring disk electrode device. Specifically, linear sweep voltammetry ($N_2$-LSV) in a nitrogen atmosphere and linear sweep voltammetry ($O_2$-LSV) in an oxygen atmosphere were performed through use of the tripolar rotating ring disk electrode device including the working electrode containing the carbon catalyst.

In the $N_2$-LSV, first, nitrogen bubbling was performed for 10 minutes to remove oxygen in the electrolytic solution. Then, the electrodes were rotated at a rotation speed of 1,600 rpm, and a current density was recorded as a function of a potential when potential sweep was performed at a sweep speed of 20 mV/sec.

In the $O_2$-LSV, further, oxygen bubbling was performed for 10 minutes, to thereby fill saturated oxygen into the electrolytic solution. After that, the electrodes were rotated at a rotation speed of 1,600 rpm, and a current density was recorded as a function of a potential when potential sweep was performed at a sweep speed of 20 mV/sec ($O_2$-LSV). Then, the $N_2$-LSV was subtracted from the $O_2$-LSV to obtain an oxygen reduction voltammogram. In the obtained oxygen reduction voltammogram, signs were assigned to numerical values so that a reduction current had a negative value, and an oxidation current had a positive value.

From the oxygen reduction voltammogram thus obtained, a current density $i_{0.7}$ (mA/cm$^2$) at the time of application of a voltage of 0.7 V (vs. NHE) was recorded as one indicator for indicating the catalytic activity at the time of starting a durability test of the carbon catalyst.

Example 1

A CC layer containing a carbon catalyst was produced. Specifically, first, 0.25 g of the carbon catalyst prepared in Catalyst Preparation Example 1, 3.5 g of a 5 wt % solution of an ionomer having an EW value of 700, and 25 g of balls were loaded into a pot and mixed with a ball mill at 200 rpm for 50 minutes, to thereby obtain a slurry-like CC layer composition containing the carbon catalyst uniformly dispersed therein.

The obtained slurry-like CC layer composition was applied onto a region of a gas diffusion layer ("29BC", manufactured by SGL Carbon) (2.3 cm×2.3 cm) having an area of 5 cm$^2$ so that the content of the carbon catalyst became 2.5 mg/cm$^2$, followed by being dried, to thereby form a CC layer containing the carbon catalyst and having an electrolyte material ratio of 0.7 on the gas diffusion layer.

In addition, a Pt layer containing platinum was produced. Specifically, 0.25 g of platinum-supported carbon (hereinafter referred to as "Pt/C") (UNPC 40-11, manufactured by Ishifuku Metal Industry Co., Ltd.) serving as a platinum-containing catalyst, which contained a carbon support and platinum particles supported on the carbon support, 3.5 g of a 5 wt % solution of an ionomer having an EW value of 700, 2.5 g of distilled water, and 25 g of balls were loaded into a pot and mixed with a ball mill at 200 rpm for 50 minutes, to thereby obtain a slurry-like Pt layer composition containing the Pt/C uniformly dispersed therein and having an electrolyte material ratio of 0.7.

The obtained slurry-like Pt layer composition was applied onto a region of a solid polymer electrolyte membrane (Nafion (trademark) 211, manufactured by Dupont) (2.3 cm×2.3 cm) having an area of 5 cm$^2$ so that the content of the platinum became 0.050 mg/cm$^2$, followed by being dried, to thereby form a Pt layer containing platinum and having an electrolyte material ratio of 0.7 on the solid polymer electrolyte membrane.

As the Pt/C, Pt/C having a ratio of the weight of platinum contained in the Pt/C to the weight of the Pt/C of 40 wt % was used. The content of platinum in the Pt layer was calculated by dividing the weight of platinum contained in the Pt/C in the Pt layer by the area of the Pt layer. The area of the CC layer and the area of the Pt layer were both 5 cm$^2$, and hence the area of the catalyst layer of the cathode formed of the CC layer and the Pt layer was also 5 cm$^2$.

Meanwhile, an anode was produced. Specifically, 0.5 g of Pt/C, 10 g of a 5 wt % Nafion (trademark) solution (manufactured by Sigma-Aldrich), 2 g of distilled water, and 25 g of balls were loaded into a pot and mixed with a ball mill at 200 rpm for 50 minutes, to thereby prepare a slurry-like anode composition. The slurry-like anode composition was applied onto a region of a gas diffusion layer having an area of 5 cm$^2$ so that the content of the Pt/C became 0.3 mg/cm$^2$ followed by being dried, to thereby form an anode formed of the catalyst layer containing the Pt/C on the gas diffusion layer.

A MEA including a pair of gas diffusion layers, a solid polymer electrolyte membrane arranged between the pair of gas diffusion layers, the cathode arranged between one of the gas diffusion layers and the solid polymer electrolyte membrane, and the anode arranged between the other one of the gas diffusion layers and the solid polymer electrolyte membrane, and a unit cell including the MEA, were manufactured.

Specifically, a MEA was manufactured by subjecting a laminate obtained by sandwiching the solid polymer electrolyte membrane between the pair of gas diffusion layers to pressure bonding under the conditions of 150° C. and 1 MPa for 3 minutes so that the CC layer formed on the one of the gas diffusion layers and the Pt layer formed on the solid polymer electrolyte membrane were brought into contact with each other, and so that the surface of the solid polymer electrolyte membrane on which the Pt layer was not formed and the anode formed on the other one of the gas diffusion layers were brought into contact with each other. Then, a pair of gaskets was attached to the MEA so as to sandwich the MEA. Further, the pair of gaskets was sandwiched between a pair of separators, to thereby manufacture a unit cell of a fuel cell.

After that, the unit cell manufactured as described above was installed in a fuel cell automatic evaluation system (manufactured by Toyo Corporation), and a power generation test was performed. In the power generation test, first, an open-circuit voltage was measured for 5 minutes by supplying, under a back pressure of 20 kPa, air (oxygen) having a relative humidity of 50% to the cathode of the unit cell at 2.0 L/min, supplying hydrogen having a relative humidity of 50% to the anode of the unit cell at 0.2 L/min, and setting a cell temperature to 55° C. After that, while a cell current density was changed from 1.5 A/cm$^2$ to 0 A/cm$^2$, each current density was held for 3 minutes, to thereby measure a cell voltage at each current density. In this power generation test, a potential (mV) observed at a current density of 0.2 A/cm$^2$ was recorded as an initial potential BOL (Beginning Of Life) as one indicator for indicating the catalytic activity at the time of starting the durability test.

Then, a poisoning test was performed. Specifically, first, under a back pressure of 20 kPa, air (oxygen) having a relative humidity of 50% was supplied to the cathode of the unit cell at 2.0 L/min, hydrogen having a relative humidity of 50% was supplied to the anode of the unit cell at 0.2 L/min, and a current density of 0.3 A/cm$^2$ was held for 30 minutes at a cell temperature of 55° C. After that, under a back pressure of 20 kPa, dry air (oxygen) containing 10 ppm sulfur dioxide was supplied to the cathode at 0.2 L/min, hydrogen having a relative humidity of 50% was supplied to the anode at 0.2 L/min, and a current density of 0.3 A/cm$^2$ was held for 90 minutes at the cell temperature of 55° C. Further, under a back pressure of 20 kPa, air (oxygen) having a relative humidity of 50% was supplied to the cathode at 2.0 L/min, hydrogen having a relative humidity of 50% was supplied to the anode at 0.2 L/min, and a current density of 0.3 A/cm$^2$ was held for 30 minute at the cell temperature of 55° C.

After that, a current holding test (durability test) was performed. Specifically, under aback pressure of 70 kPa, saturated humidified air (oxygen) was supplied to the cathode of the unit cell at 2.0 L/min, saturated humidified hydrogen was supplied to the anode of the unit cell at 0.5 L/min, and the state where the current density was kept constant at 0.5 A/cm$^2$ at the cell temperature was 75° C. was maintained for 100 hours.

Further, immediately after the durability test for 100 hours was finished, the power generation test was performed again. In this power generation test, a potential (mV) observed at a current density of 0.2 A/cm$^2$ was recorded as a potential EOL (End Of Life) as one indicator for indicating the catalytic activity after the durability test was finished.

Then, a value obtained by subtracting the potential EOL (mV) observed at a current density of 0.2 A/cm$^2$ in the power generation test after the durability test from the potential BOL (mV) observed at a current density of 0.2 A/cm$^2$ in the power generation test at the time of starting the durability test was obtained as a potential decrease amount (BOL-EOL) (mV) in the durability test for 100 hours.

Example 2

A cathode, a MEA, and a unit cell were manufactured in the same manner as in Example 1 except that the content of platinum in the Pt layer was 0.020 mg/cm$^2$, and a power generation test, a poisoning test, and a durability test were performed.

Example 3

A cathode, a MEA, and a unit cell were manufactured in the same manner as in Example 1 except that the content of platinum in the Pt layer was 0.005 mg/cm$^2$, and a power generation test, a poisoning test, and a durability test were performed.

Example 4

A cathode, a MEA, and a unit cell were manufactured in the same manner as in Example 1 except that the content of platinum in the Pt layer was 0.100 mg/cm$^2$, and a power generation test, a poisoning test, and a durability test were performed.

Example 5

A cathode, a MEA, and a unit cell were manufactured in the same manner as in Example 1 except that the content of the carbon catalyst in the CC layer was 1.0 mg/cm$^2$, and a power generation test, a poisoning test, and a durability test were performed.

Example 6

A cathode, a MEA, and a unit cell were manufactured in the same manner as in Example 1 except that the content of the carbon catalyst in the CC layer was 1.0 mg/cm$^2$, and the content of platinum in the Pt layer was 0.020 mg/cm$^2$, and a power generation test, a poisoning test, and a durability test were performed.

Example 7

A cathode, a MEA, and a unit cell were manufactured in the same manner as in Example 1 except that the content of the carbon catalyst in the CC layer was 1.0 mg/cm$^2$, and the content of platinum in the Pt layer was 0.005 mg/cm$^2$, and a power generation test, a poisoning test, and a durability test were performed.

Example 8

A cathode, a MEA, and a unit cell were manufactured in the same manner as in Example 1 except that the content of the carbon catalyst in the CC layer was 6.0 mg/cm$^2$, and a power generation test, a poisoning test, and a durability test were performed.

Example 9

A cathode, a MEA, and a unit cell were manufactured in the same manner as in Example 1 except that the electrolyte material ratio of the CC layer was 0.9, and a power generation test, a poisoning test, and a durability test were performed.

Example 10

A cathode, a MEA, and a unit cell were manufactured in the same manner as in Example 1 except that the electrolyte material ratio of the CC layer was 0.9, and the content of platinum in the Pt layer was 0.020 mg/cm$^2$, and a power generation test, a poisoning test, and a durability test were performed.

Example 11

A cathode, a MEA, and a unit cell were manufactured in the same manner as in Example 1 except that the electrolyte material ratio of the Pt layer was 0.5, and a power generation test, a poisoning test, and a durability test were performed.

Example 12

A cathode, a MEA, and a unit cell were manufactured in the same manner as in Example 1 except that the electrolyte material ratio of the Pt layer was 0.5, and the content of platinum in the Pt layer was 0.020 mg/cm$^2$, and a power generation test, a poisoning test, and a durability test were performed.

Example 13

A cathode, a MEA, and a unit cell were manufactured in the same manner as in Example 1 except that the electrolyte material ratio of the Pt layer was 0.2, and a power generation test, a poisoning test, and a durability test were performed.

Example 14

A cathode, a MEA, and a unit cell were manufactured in the same manner as in Example 1 except that the electrolyte material ratio of the Pt layer was 0.2, and the content of platinum in the Pt layer was 0.020 mg/cm$^2$, and a power generation test, a poisoning test, and a durability test were performed.

Example 15

A cathode, a MEA, and a unit cell were manufactured in the same manner as in Example 1 except that the carbon catalyst produced in Catalyst Preparation Example 2 was used as the carbon catalyst, and a power generation test, a poisoning test, and a durability test were performed.

Example 16

A cathode, a MEA, and a unit cell were manufactured in the same manner as in Example 1 except that the carbon catalyst produced in Catalyst Preparation Example 3 was used as the carbon catalyst, and a power generation test, a poisoning test, and a durability test were performed.

Example 17

A cathode, a MEA, and a unit cell were manufactured in the same manner as in Example 1 except that the carbon catalyst produced in Catalyst Preparation Example 4 was used as the carbon catalyst, and a power generation test, a poisoning test, and a durability test were performed.

Example 18

A cathode, a MEA, and a unit cell were manufactured in the same manner as in Example 1 except that the carbon catalyst produced in Catalyst Preparation Example 5 was used as the carbon catalyst, and a power generation test, a poisoning test, and a durability test were performed.

Example 19

A cathode, a MEA, and a unit cell were manufactured in the same manner as in Example 1 except that the carbon catalyst produced in Catalyst Preparation Example 6 was used as the carbon catalyst, and a power generation test, a poisoning test, and a durability test were performed.

Example 20

A cathode, a MEA, and a unit cell were manufactured in the same manner as in Example 1 except that Pt/C having a ratio of the weight of platinum contained in the Pt/C to the weight of the Pt/C of 20 wt % (UNPC 20-II, manufactured by Ishifuku Metal Industry Co., Ltd.) was used as the Pt/C, and a power generation test, a poisoning test, and a durability test were performed.

Example 21

A cathode, a MEA, and a unit cell were manufactured in the same manner as in Example 1 except that the electrolyte material ratio of the Pt layer was 1.2, and a power generation test, a poisoning test, and a durability test were performed.

Example 22

A cathode, a MEA, and a unit cell were manufactured in the same manner as in Example 1 except that the electrolyte material ratio of the Pt layer was 0.1, and a power generation test, a poisoning test, and a durability test were performed.

Example 23

A cathode, a MEA, and a unit cell were manufactured in the same manner as in Example 1 except that the electrolyte material ratio of the CC layer was 0.5, and a power generation test, a poisoning test, and a durability test were performed.

Comparative Example 1

A cathode, a MEA, and a unit cell were manufactured in the same manner as in Example 1 except that the content of platinum in the Pt layer was 0.200 mg/cm$^2$, and a power generation test, a poisoning test, and a durability test were performed.

Comparative Example 2

A cathode, a MEA, and a unit cell were manufactured in the same manner as in Example 1 except that the content of platinum in the Pt layer was 0.001 mg/cm$^2$, and a power generation test, a poisoning test, and a durability test were performed.

Comparative Example 3

A cathode, a MEA, and a unit cell were manufactured in the same manner as in Example 1 except that the content of platinum in the Pt layer was 0.001 mg/cm$^2$, and the content of the carbon catalyst in the CC layer was 1.0 mg/cm$^2$, and a power generation test, a poisoning test, and a durability test were performed.

Comparative Example 4

A cathode, a MEA, and a unit cell were manufactured in the same manner as in Example 1 except that the Pt layer was not produced (the cathode did not include the Pt layer), and a power generation test, a poisoning test, and a durability test were performed.

Comparative Example 5

A cathode, a MEA, and a unit cell were manufactured in the same manner as in Example 1 except that the Pt layer was not produced (the cathode did not include the Pt layer), and the content of the carbon catalyst in the CC layer was 1.0 mg/cm$^2$, and a power generation test, a poisoning test, and a durability test were performed.

Comparative Example 6

A cathode, a MEA, and a unit cell were manufactured in the same manner as in Example 1 except that the CC layer was not produced (the cathode did not include the CC layer), and the content of platinum in the Pt layer was 0.100 mg/cm$^2$, and a power generation test, a poisoning test, and a durability test were performed.

Comparative Example 7

A cathode, a MEA, and a unit cell were manufactured in the same manner as in Example 1 except that the CC layer was not produced (the cathode did not include the CC layer), and a power generation test, a poisoning test, and a durability test were performed.

Comparative Example 8

A cathode, a MEA, and a unit cell were manufactured in the same manner as in Example 1 except that the CC layer was not produced (the cathode did not include the CC layer), and the content of platinum in the Pt layer was 0.020 mg/cm$^2$, and a power generation test, a poisoning test, and a durability test were performed.

Comparative Example 9

A cathode, a MEA, and a unit cell were manufactured in the same manner as in Example 1 except that the content of the carbon catalyst in the CC layer was 10.0 mg/cm$^2$, and a power generation test, a poisoning test, and a durability test were performed.

Comparative Example 10

A cathode, a MEA, and a unit cell were manufactured in the same manner as in Example 1 except that the content of the carbon catalyst in the CC layer was 10.0 mg/cm$^2$, and the content of platinum in the Pt layer was 0.020 mg/cm$^2$, and a power generation test, a poisoning test, and a durability test were performed.

Comparative Example 11

A cathode, a MEA, and a unit cell were manufactured in the same manner as in Example 1 except that the content of the carbon catalyst in the CC layer was 0.2 mg/cm$^2$, and a power generation test, a poisoning test, and a durability test were performed.

Comparative Example 12

A cathode, a MEA, and a unit cell were manufactured in the same manner as in Example 1 except that the content of the carbon catalyst in the CC layer was 0.2 mg/cm$^2$, and the content of platinum in the Pt layer was 0.020 mg/cm$^2$, and a power generation test, a poisoning test, and a durability test were performed.

Comparative Example 13

A cathode, a MEA, and a unit cell were manufactured in the same manner as in Example 1 except that the carbon catalyst produced in Comparative Preparation Example 1 was used as the carbon catalyst, and a power generation test, a poisoning test, and a durability test were performed.

Comparative Example 14

A cathode, a MEA, and a unit cell were manufactured in the same manner as in Example 1 except that the carbon catalyst produced in Comparative Preparation Example 2 was used as the carbon catalyst, and a power generation test, a poisoning test, and a durability test were performed.

Comparative Example 15

A cathode, a MEA, and a unit cell were manufactured in the same manner as in Example 1 except that the carbon catalyst produced in Comparative Preparation Example 3 was used as the carbon catalyst, and a power generation test, a poisoning test, and a durability test were performed.

Comparative Example 16

A cathode, a MEA, and a unit cell were manufactured in the same manner as in Example 1 except that the carbon catalyst produced in Comparative Preparation Example 4 was used as the carbon catalyst, and a power generation test, a poisoning test, and a durability test were performed.

[Results]

In FIG. 4A, there are shown the results obtained by evaluating the carbon catalysts obtained in Catalyst Preparation Examples 1 to 6 (in the figure, "EX. 1" to "EX. 6") and Comparative Preparation Examples 1 to 4 (in the figure, "COMPARATIVE EX. 1" to "COMPARATIVE EX. 4") for the following: a weight reduction rate (wt %) measured by TG; normalized absorbances at 7,110 eV, 7,130 eV, and 7,135 eV, and a 7,130/7,110 ratio and a 7,135/7,110 ratio measured by XAFS; and a current density $i_{0.7}$ (mA/cm$^2$) as an indicator for oxygen reduction activity.

In FIG. 4B, there are shown the results obtained by evaluating the carbon catalysts obtained in Catalyst Preparation Examples 1 to 6 and Comparative Preparation Examples 1 to 4 for the following: a BET specific surface area (m$^2$/g); a micropore volume (cm$^3$/g); a mesopore volume (cm$^3$/g); a macropore volume (cm$^3$/g); a mesopore ratio (%); a content of iron (wt %) measured by ICP-MS; a carbon atom concentration (atm %), an oxygen atom concentration (atm %), a nitrogen atom concentration (atm %), and a N/C ratio (%) measured by XPS; and a carbon atom content (wt %), a hydrogen atom content (wt %), a nitrogen atom content (wt %), and a N/C ratio (%) measured by elemental analysis (combustion method).

As shown in FIG. 4A, the weight reduction rate measured by TG of each of the carbon catalysts of Comparative Preparation Examples 2, 3, and 4 was 12.5 wt % or more. In addition, the 7,130/7,110 ratio and the 7,135/7,110 ratio measured by XAFS of the carbon catalyst of Comparative Preparation Example 1 were each 6.4 or less. The current density $i_{0.7}$ indicating oxygen reduction activity of the carbon catalyst of Comparative Preparation Example 2 was −2.0 mA/cm$^2$, but that of each of the carbon catalysts of Comparative Preparation Examples 1, 3, and 4 was merely from −0.1 mA/cm$^2$ to −0.9 mA/cm$^2$.

On the other hand, in each of the carbon catalysts of Catalyst Preparation Examples 1 to 6, the weight reduction rate measured by TG was 7.3 wt % or less, and both the 7,130/7110 ratio and the 7,135/7,110 ratio measured by XAFS were 13.8 or more. The current density $i_{0.7}$ indicating oxygen reduction activity of each of the carbon catalysts of Catalyst Preparation Examples 1 to 6 reached from −1.2 mA/cm$^2$ to −1.4 mA/cm$^2$.

As shown in FIG. 4B, the BET specific surface area of each of the carbon catalysts of Catalyst Preparation Examples 1 to 6 was 1,440 m$^2$/g or more. The micropore volume thereof was from 0.40 cm$^3$/g to 0.52 cm$^3$/g. The mesopore volume thereof was from 0.26 cm$^3$/g to 0.50 cm$^3$/g. The macropore volume thereof was from 0.01 cm$^3$/g to 0.02 cm$^3$/g. The mesopore ratio thereof was 36% or more.

The content of iron measured by the ICP-MS of each of the carbon catalysts of Catalyst Preparation Examples 1 to 6 was from 0.21 wt % to 0.30 wt %. The carbon atom concentration measured by XPS of each of the carbon catalysts of Catalyst Preparation Examples 1 to 6 was from 84.75 atm % to 90.74 atm %. The oxygen atom concentration measured by XPS of each of the carbon catalysts was from 7.24 atm % to 13.65 atm %. The nitrogen atom concentration measured by XPS of each of the carbon catalysts was from 1.42 atm % to 1.91 atm %. The N/C ratio measured by XPS of each of the carbon catalysts was from 1.60% to 2.14%. In particular, the oxygen atom concentration measured by XPS of each of the carbon catalysts of Catalyst Preparation Examples 1 to 6 was larger than that (3.01 atm % to 5.85 atm %) of each of the carbon catalysts of Comparative Preparation Examples 1 to 4.

The nitrogen atom content measured by elemental analysis of each of the carbon catalysts of Catalyst Preparation Examples 1 to 6 was from 87.30 wt % to 98.62 wt %. The hydrogen atom content measured by elemental analysis of each of the carbon catalysts was from 0.43 wt % to 1.74 wt %. The nitrogen atom content measured by elemental analysis of each of the carbon catalysts was from 1.47 wt % to 1.98 wt %. The N/C ratio measured by elemental analysis of each of the carbon catalysts was from 1.58% to 2.18%.

In FIG. 5, there are shown, regarding each of the cathodes manufactured in Examples 1 to 23 and Comparative Examples 1 to 16, the conditions of the carbon catalyst contained in the CC layer, the conditions of platinum contained in the Pt layer, and the results of the power generation test and the durability test of the battery including the cathode.

Specifically, regarding the carbon catalyst, there are shown in which of Catalyst Preparation Examples 1 to 6 and Comparative Preparation Examples 1 to 4, the carbon catalyst was produced (in the figure, "EX. 1" to "EX. 6" correspond to Catalyst Preparation Examples 1 to 6, and "COMPARATIVE EX. 1" to "COMPARATIVE EX. 4" correspond to Comparative Preparation Examples 1 to 4), the content of the carbon catalyst in the CC layer (in the figure, "CATALYST CONTENT (mg/cm$^2$)"), and the electrolyte material ratio in the CC layer. Regarding platinum, there are shown a ratio (in the figure, "Pt/(Pt/SUPPORT)") (wt %) of the weight of platinum contained in Pt/C (in the figure, "Pt/SUPPORT") to the weight of the Pt/C, the content of platinum in the Pt layer (in the figure, "CATALYST CONTENT (mg-Pt/cm$^2$)"), and the electrolyte material ratio in the Pt layer. Regarding the power generation test and the durability test, there are shown BOL (mV), EOL (mV), and a potential decrease amount (in the figure, "BOL-EOL") (mV).

As shown in FIG. 5, in Examples 1 to 23 each using the cathode formed of the CC layer having a content of the carbon catalyst of from 1.0 mg/cm$^2$ to 6.0 mg/cm$^2$ and the Pt layer having a content of platinum of from 0.005 mg/cm$^2$ to 0.100 mg/cm$^2$, an initial potential (BOL) of from 700.2 mV to 760.6 mV was achieved in the power generation test, and the potential decrease amount (BOL-EOL) in the durability test including the poisoning test performed later was suppressed to from 27.4 mV to 58.0 mV. That is, in Examples 1 to 23, excellent durability was achieved in addition to achievement of a high initial potential.

On the other hand, in Comparative Example 1 in which the content of platinum in the Pt layer was 0.200 mg/cm$^2$, Comparative Examples 2 and 3 in each of which the content of platinum in the Pt layer was 0.001 mg/cm$^2$, Comparative Examples 4 and 5 each using the cathode that did not include the Pt layer, Comparative Examples 6 to 8 each using the cathode that did not include the CC layer, Comparative Examples 9 and 10 in each of which the content of the carbon catalyst in the CC layer was 10.0 mg/cm$^2$, Comparative Examples 11 and 12 in each of which the content of the carbon catalyst in the CC layer was 0.2 mg/cm$^2$, and Comparative Examples 13 to 16 using the carbon catalysts of Comparative Preparation Examples 1 to 4, respectively, the initial potential (BOL) in the power generation test was from 446.8 mV to 716.4 mV, and the potential decrease amount (BOL-EOL) in the durability test was from 66.9 mV to 251.5 mV. That is, the durability exhibited in each of Comparative Examples 1 to 16 was lower than that in Examples 1 to 23, and hence a high initial potential was not necessarily achieved.

It was confirmed that the cathode, the MEA, and the battery according to the present invention had excellent durability. In addition, as described above, the durability test was performed following the poisoning test, and thus it was confirmed that the cathode, the MEA, and the battery according to the present invention also had excellent poisoning resistance. Further, from the results of the power generation test, it was confirmed that the cathode, the MEA, and the battery according to the present invention also had excellent power generation performance.

The invention claimed is:

1. A cathode of a battery including an electrolyte membrane, the cathode comprising:
    a first layer which contains 0.3 mg/cm$^2$ or more and 9.0 mg/cm$^2$ or less of a carbon catalyst; and
    a second layer which is arranged between the electrolyte membrane and the first layer in the battery, and which contains 0.002 mg/cm$^2$ or more and 0.190 mg/cm$^2$ or less of platinum,
    wherein the carbon catalyst has a ratio of a mesopore volume to a total pore volume of 30% or more.

2. The cathode according to claim 1, wherein the carbon catalyst has a content of iron of 0.01 wt % or more measured by inductively-coupled plasma mass spectrometry.

3. The cathode according to claim 1, wherein the carbon catalyst exhibits a nitrogen atom content of 1.0 wt % or more measured by elemental analysis based on a combustion method.

4. The cathode according to claim 1, wherein the carbon catalyst exhibits a ratio of a nitrogen atom content to a carbon atom content of 1.1% or more measured by elemental analysis based on a combustion method.

5. The cathode according to claim 1, wherein the carbon catalyst contains iron and a metal other than the iron.

6. The cathode according to claim 1, wherein the carbon catalyst has a specific surface area of 800 m$^2$/g or more measured by a BET method.

7. The cathode according to claim 1,
    wherein the first layer contains an electrolyte material, and
    wherein the first layer has a ratio of a weight of the electrolyte material to a remaining weight, obtained by subtracting the weight of the electrolyte material from a weight of the first layer, of 0.30 or more.

8. The cathode according to claim 1,
    wherein the second layer contains an electrolyte material, and
    wherein the second layer has a ratio of a weight of the electrolyte material to a remaining weight, obtained by subtracting the weight of the electrolyte material from a weight of the second layer, of 0.05 or more.

9. The cathode according to claim 1, wherein the cathode has a ratio of a content of the platinum in the second layer to a content of the carbon catalyst in the first layer of 20.00 wt % or less.

10. The cathode according to claim 1, wherein the first layer and/or the second layer contains an electrolyte material having an EW value of 300 or more and 1,100 or less.

11. A membrane electrode assembly, comprising the cathode of claim 3, an anode, and the electrolyte membrane arranged between the cathode and the anode.

12. A battery, comprising the cathode of claim 3, or a membrane electrode assembly, comprising the cathode, an anode, and the electrolyte membrane arranged between the cathode and the anode.

13. A cathode of a battery including an electrolyte membrane, the cathode comprising:
    a first layer which contains 0.3 mg/cm$^2$ or more and 9.0 mg/cm$^2$ or less of a carbon catalyst; and
    a second layer which is arranged between the electrolyte membrane and the first layer in the battery, and which contains 0.002 mg/cm$^2$ or more and 0.190 mg/cm$^2$ or less of platinum,
    wherein the carbon catalyst has a specific surface area of 1200 m$^2$/g or more measured by a BET method.

14. The cathode according to claim 13, wherein the carbon catalyst exhibits a nitrogen atom content of 1.0 wt % or more measured by elemental analysis based on a combustion method.

15. The cathode according to claim 13, wherein the carbon catalyst exhibits a ratio of a nitrogen atom content to a carbon atom content of 1.1% or more measured by elemental analysis based on a combustion method.

16. The cathode according to claim 13,
    wherein the first layer contains an electrolyte material, and
    wherein the first layer has a ratio of a weight of the electrolyte material to a remaining weight, obtained by subtracting the weight of the electrolyte material from a weight of the first layer, of 0.30 or more.

17. The cathode according to claim 13,
    wherein the second layer contains an electrolyte material, and
    wherein the second layer has a ratio of a weight of the electrolyte material to a remaining weight, obtained by subtracting the weight of the electrolyte material from a weight of the second layer, of 0.05 or more.

18. The cathode according to claim 13, wherein the cathode has a ratio of a content of the platinum in the second layer to a content of the carbon catalyst in the first layer of 20.00 wt % or less.

19. A membrane electrode assembly, comprising the cathode of claim 13, an anode, and the electrolyte membrane arranged between the cathode and the anode.

20. A battery, comprising the cathode of claim 13, or a membrane electrode assembly, comprising the cathode, an anode, and the electrolyte membrane arranged between the cathode and the anode.

* * * * *